United States Patent
Lin et al.

(10) Patent No.: US 11,761,476 B2
(45) Date of Patent: Sep. 19, 2023

(54) TORQUE HINGE MODULE

(71) Applicants: Che-Hsien Lin, Taipei (TW); Che-Hsien Chu, Taipei (TW)

(72) Inventors: Che-Hsien Lin, Taipei (TW); Che-Hsien Chu, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 53 days.

(21) Appl. No.: 17/103,953

(22) Filed: Nov. 25, 2020

(65) Prior Publication Data
US 2021/0156416 A1    May 27, 2021

Related U.S. Application Data

(60) Provisional application No. 62/940,217, filed on Nov. 25, 2019.

(51) Int. Cl.
*F16C 11/04* (2006.01)
*G06F 1/16* (2006.01)
(Continued)

(52) U.S. Cl.
CPC .......... *F16C 11/04* (2013.01); *G06F 1/1681* (2013.01); *E05D 3/122* (2013.01); *E05D 11/0054* (2013.01); *E05Y 2900/606* (2013.01)

(58) Field of Classification Search
CPC ... E05D 11/087; E05D 11/0054; E05D 3/122; E05Y 2900/606
See application file for complete search history.

(56) References Cited

U.S. PATENT DOCUMENTS 6,230,365 B1 * 5/2001 Lu .................. G06F 1/1616
16/337
6,467,129 B1 * 10/2002 Bae ................ G06F 1/1616
16/337
(Continued)

FOREIGN PATENT DOCUMENTS

CN    103775482    5/2014
CN    110005698    7/2019
TW    201823599    7/2018

OTHER PUBLICATIONS

"Office Action of Taiwan Counterpart Application", dated Jan. 21, 2021, p. 1-p. 6.
(Continued)

*Primary Examiner* — Victor D Batson
*Assistant Examiner* — Matthew J Sullivan
(74) *Attorney, Agent, or Firm* — JCIPRNET

(57) ABSTRACT

A torque hinge module including a rotating element and a torque assembly is provided. The torque assembly rotatably sleeves the rotating element to generate torque. One of the rotating element and the torque assembly has a first bearing surface, and the other one has a second bearing surface and a third bearing surface corresponding to the first bearing surface. There is a first included angle between a plane where the second bearing surface is located and a plane where the third bearing surface have is located. A shape of the first bearing surface corresponds to a shape of the second bearing surface and a shape of the third bearing surface. When the rotating element rotates relative to the torque assembly to make the first bearing surface bear against the second bearing surface or the third bearing surface, the torque is reduced.

8 Claims, 29 Drawing Sheets

(51) Int. Cl.
*E05D 11/00* (2006.01)
*E05D 3/12* (2006.01)

(56) References Cited

U.S. PATENT DOCUMENTS

| | | | | |
|---|---|---|---|---|
| 6,470,532 B2* | 10/2002 | Rude | ................... | G06F 1/1681 16/338 |
| 6,530,123 B1* | 3/2003 | Wahlstedt | ............. | G06F 1/1616 16/337 |
| 7,500,288 B2* | 3/2009 | Chung | ................. | E05D 11/082 16/374 |
| 7,958,600 B2* | 6/2011 | Kuo | ...................... | G06F 1/1681 16/342 |
| 8,720,011 B1* | 5/2014 | Hsu | ........................ | E05D 3/122 16/354 |
| 8,959,716 B2* | 2/2015 | Hsu | ...................... | G06F 1/1681 16/302 |
| 9,206,633 B1* | 12/2015 | Ju | ........................ | G06F 1/1681 |
| 9,683,398 B2* | 6/2017 | Chuang | ................. | G06F 1/1681 |
| 10,019,039 B1* | 7/2018 | Hsu | ...................... | E05D 11/082 |
| 10,244,653 B2* | 3/2019 | Hsu | ........................ | E05D 3/122 |
| 10,931,070 B1* | 2/2021 | Files | ..................... | H01R 24/40 |
| 11,054,866 B2* | 7/2021 | Lin | ....................... | H04M 1/022 |
| 2008/0295288 A1 | 12/2008 | Hung | | |
| 2011/0146159 A1* | 6/2011 | Zhang | ................... | G06F 1/1681 16/327 |
| 2014/0338483 A1* | 11/2014 | Hsu | ........................ | F16H 21/44 74/96 |
| 2015/0245511 A1* | 8/2015 | Hsu | ........................ | H04M 1/02 74/63 |
| 2015/0309541 A1* | 10/2015 | Horng | ................... | E05D 11/082 16/250 |
| 2016/0362919 A1* | 12/2016 | Tian | ........................ | E05D 3/06 |
| 2018/0032110 A1* | 2/2018 | Hsu | ..................... | E05D 11/0054 |
| 2019/0146559 A1* | 5/2019 | Chiang | ................ | G06F 1/1681 361/809 |
| 2020/0063476 A1* | 2/2020 | Lin | ........................ | E05D 3/122 |
| 2020/0064890 A1* | 2/2020 | Siddiqui | ............... | G06F 1/1681 |
| 2020/0409429 A1* | 12/2020 | Hsu | ........................ | G06F 1/1616 |
| 2020/0409430 A1* | 12/2020 | Wu | ........................ | G06F 1/1616 |
| 2020/0409431 A1* | 12/2020 | Fan | ........................ | G06F 1/1681 |
| 2021/0149454 A1* | 5/2021 | Liu | ........................ | E05D 3/122 |
| 2021/0165466 A1* | 6/2021 | Kang | ................... | G06F 1/1616 |
| 2021/0172225 A1* | 6/2021 | Chang | ................. | G06F 1/1681 |
| 2022/0011827 A1* | 1/2022 | Kim | ........................ | G06F 1/1681 |
| 2022/0075429 A1* | 3/2022 | Hazama | ................ | G06F 1/1681 |

OTHER PUBLICATIONS

"Office Action of China Counterpart Application", dated Nov. 21, 2022, p. 1-p. 8.

* cited by examiner

TORQUE HINGE MODULE

CROSS-REFERENCE TO RELATED APPLICATION

This application claims the priority benefit of U.S. provisional application Ser. No. 62/940,217, filed on Nov. 25, 2019. The entirety of the above-mentioned patent application is hereby incorporated by reference herein and made a part of this specification.

BACKGROUND

Technical Field

The disclosure relates to a torque hinge module, and particularly relates to a torque hinge module of a folding electronic device.

Description of Related Art

Generally, a folding electronic device includes two bodies and a torque hinge module. The two bodies are pivotally connected through the torque hinge module. When the two bodies are opened and closed relative to each other, the torque hinge module may generate torque. The torque hinge module may not only increase the feeling of maneuvering of a user, but may also enable the two bodies to be positioned at any angle.

Along with the development of folding electronic devices towards dual screens, there is a need for the two bodies of the folding electronic devices to be unfolded to 180 degrees relative to each other. Under such a state, users may use dual screens to watch larger display images. However, in the structure of existing torque hinge modules, when the two bodies are unfolded to 180 degrees, since the torque hinge module may accumulate torque, the two bodies are unable to be accurately unfolded to 180 degrees. In other words, the existing torque hinge module is unable to be accurately unfolded to a specific angle.

SUMMARY

The disclosure is directed to a torque hinge module, which is capable of solving the existing issue that the torque hinge module is unable to be accurately unfolded to a specific angle.

The disclosure provides a torque hinge module including a rotating element and a torque assembly. The torque assembly rotatably sleeves the rotating element to generate torque. One of the rotating element and the torque assembly has a first bearing surface, and the other one of the rotating element and the torque assembly has a second bearing surface and a third bearing surface corresponding to the first bearing surface. There is a first included angle between a plane where the second bearing surface is located and a plane where the third bearing surface is located. A shape of the first bearing surface corresponds to a shape of the second bearing surface. The shape of the first bearing surface corresponds to a shape of the third bearing surface. When the rotating element rotates relative to the torque assembly to make the first bearing surface bear against the second bearing surface or the third bearing surface, the torque is reduced.

In an embodiment of the disclosure, the rotating element has a shaft portion. A cross section is defined at the shaft portion. The cross section is perpendicular to a central axis of the shaft portion. A perfect circle is defined by an outermost periphery of the shaft portion. Orthogonal projections of the first bearing surface, the second bearing surface and the third bearing surface on the cross section are located in the perfect circle.

In an embodiment of the disclosure, the first included angle is 90 degrees.

In an embodiment of the disclosure, the rotating element has the first bearing surface. The torque assembly has the second bearing surface and the third bearing surface.

In an embodiment of the disclosure, the torque assembly includes a first torque element and a second torque element. The first torque element has the second bearing surface. The second torque element has two third bearing surfaces. The first bearing surface is suitable for bearing against the corresponding third bearing surface.

In an embodiment of the disclosure, the torque assembly has the first bearing surface. The rotating element has the second bearing surface and the third bearing surface.

In an embodiment of the disclosure, the torque assembly includes two torque elements. Each of the torque elements has the first bearing surface.

In an embodiment of the disclosure, the other one of the rotating element and the torque assembly further has a fourth bearing surface corresponding to the first bearing surface. There is a second included angle between the plane where the second bearing surface is located and a plane where the fourth bearing surface is located. When the rotating element rotates relative to the torque assembly to make the first bearing surface bear against the fourth bearing surface, the torque is reduced.

In an embodiment of the disclosure, a number of the rotating elements is two. The torque assembly is rotatably sleeved on the two rotating elements. The torque hinge module further includes two brackets and a synchronization mechanism. The brackets are fixed to the rotating elements. The synchronization mechanism is connected between the two rotating elements, so that the two rotating elements pivot synchronously.

In an embodiment of the disclosure, the torque hinge module further includes two brackets. One of the two brackets sleeves the torque assembly, and the other one of the two brackets is fixed to the rotating element.

Based on the above description, in the torque hinge module of the disclosure, by making the first bearing surface bear against the second bearing surface or the third bearing surface, the torque generated when the torque assembly is sleeved on the rotating element is reduced, which helps to accurately fix the torque hinge module at a specific angle.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
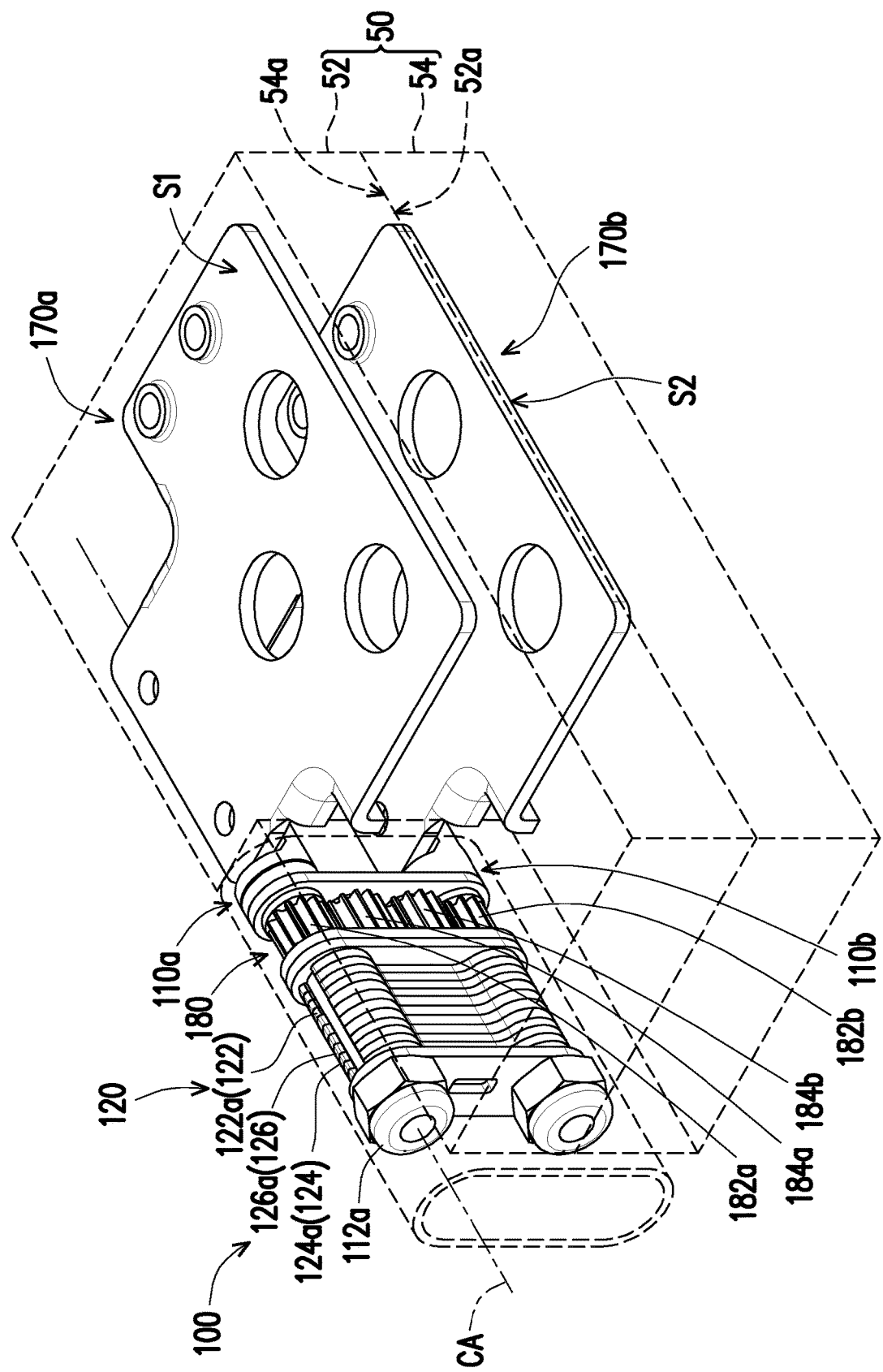
FIG. 1A is a schematic diagram of a torque hinge module according to an embodiment of the disclosure.
Figure 1B:
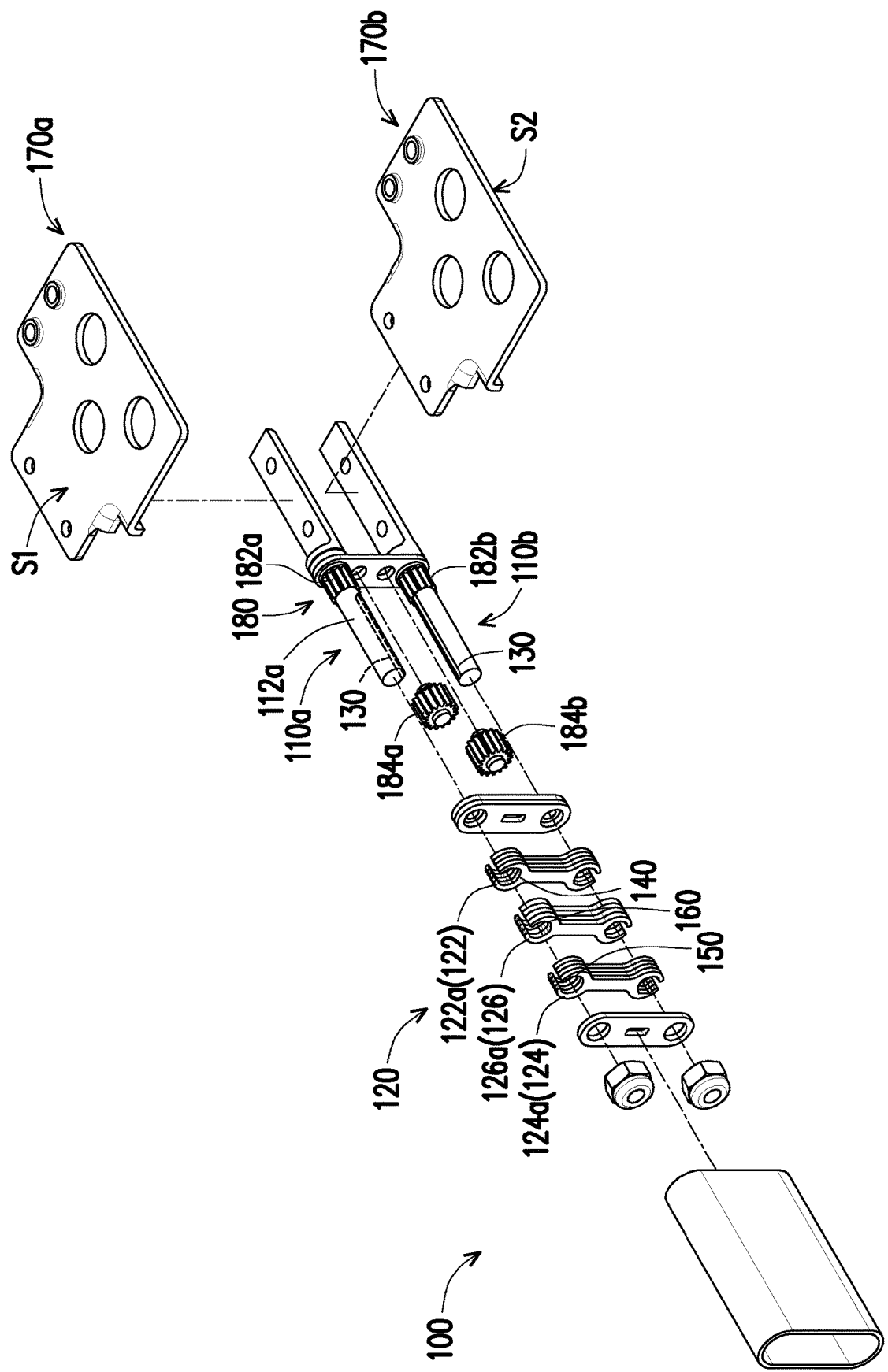
FIG. 1B is an exploded view of the torque hinge module of FIG. 1A.

FIG. 1A is a schematic diagram of a torque hinge module according to an embodiment of the disclosure. FIG. 1B is an exploded view of the torque hinge module of FIG. 1A. For the sake of clarity and ease of description, some components are shown in dotted lines in FIG. 1A and FIG. 1B.

Referring to FIG. 1A and FIG. 1B, the torque hinge module 100 may be assembled in a folding electronic device 50, so that a first body 52 may be pivoted relative to a second body 54. The folding electronic device 50 is, for example, but not limited to a notebook computer with an input module or a notebook computer with dual screens.

It should be particularly noted that terms such as first, second, third, etc., used in the following description are only for intuitively distinguishing different components to facilitate quick understanding of readers, and are not used to be limiting of the disclosure.

In detail, the torque hinge module 100 includes a rotating element 110a, a rotating element 110b, a torque assembly 120, a bracket 170a, a bracket 170b, and a synchronization mechanism 180.

The rotating element 110a and the rotating element 110b are rotatably disposed through the torque assembly 120. The rotating element 110a has a center axis CA. The synchronization mechanism 180 is connected between the rotating element 110a and the rotating element 110b to make the rotating element 110a and the rotating element 110b pivot synchronously.

In other words, the torque assembly 120 is rotatably sleeved on the rotating element 110a and the rotating element 110b, so as to generate torque. The rotating element 110A rotates by the same angle as the rotating element 110b.

The bracket 170a is fixed to the rotating element 110a, and the bracket 170a is fixed to the first body 52 to pivot synchronously along with the first body 52. The bracket 170a has a surface S1, the surface S1 is, for example, but not limited to, parallel to an inner surface 52a of the first body 52, and the surface S1 is, for example, but not limited to, parallel to the central axis CA.

Similarly, the bracket 170b is fixed to the rotating element 110b, and the bracket 170b is fixed to the second body 54 to pivot synchronously along with the second body 54. The bracket 170b has a surface S2, the surface S2 is, for example, but not limited to, parallel to an inner surface 54a of the second body 54, and the surface S2 is, for example, but not limited to, parallel to the central axis CA.

For the sake of concise description, the rotating element 110a is taken as an example for description. Those skilled in the art should understand that the configuration between the rotating element 110a and the torque assembly 120 may also be applied to the configuration between the rotating element 110b and the torque assembly 120.

Further, the torque assembly 120 includes, for example, but not limited to, a plurality of first torque elements 122 arranged in parallel, a plurality of second torque elements 124 arranged in parallel, and a plurality of third torque elements 126 arranged in parallel.

In the disclosure, each first torque element 122, for example, but not limited to, present a sheet shape, and four first torque elements 122 sleeve the rotating element 110a. Each second torque element 124, for example, but not limited to, present a sheet shape, and four second torque elements 124 sleeve the rotating element 110a. Each third torque element 126, for example, but not limited to, present a sheet shape, and four third torque elements 126 sleeve the rotating element 110a. The third torque elements 126 are located between the first torque elements 122 and the second torque elements 124.

Figure 1C:
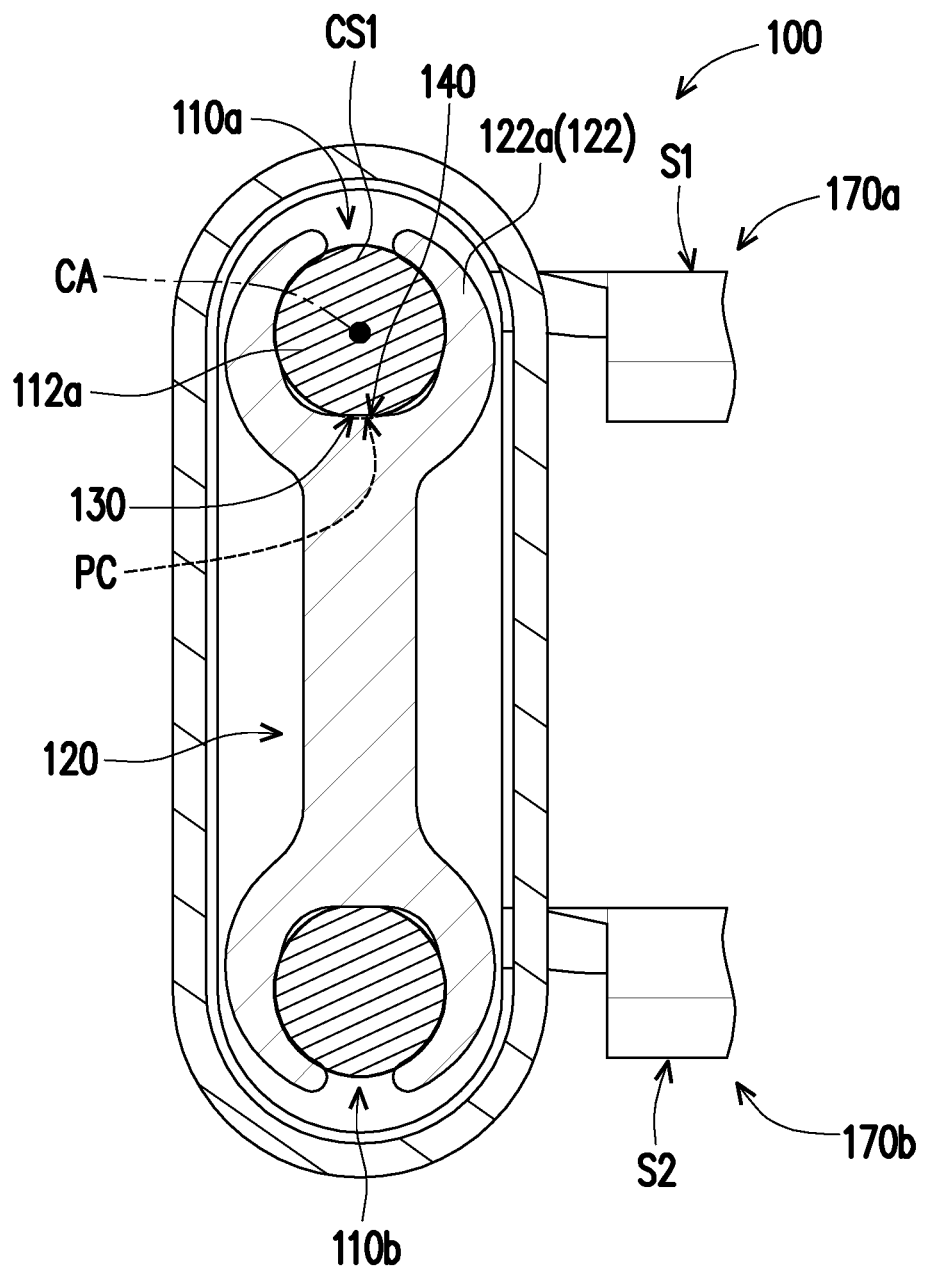
FIG. 1C to FIG. 1E illustrate an operation flow of the torque hinge module of FIG. 1A.
Figure 1D:
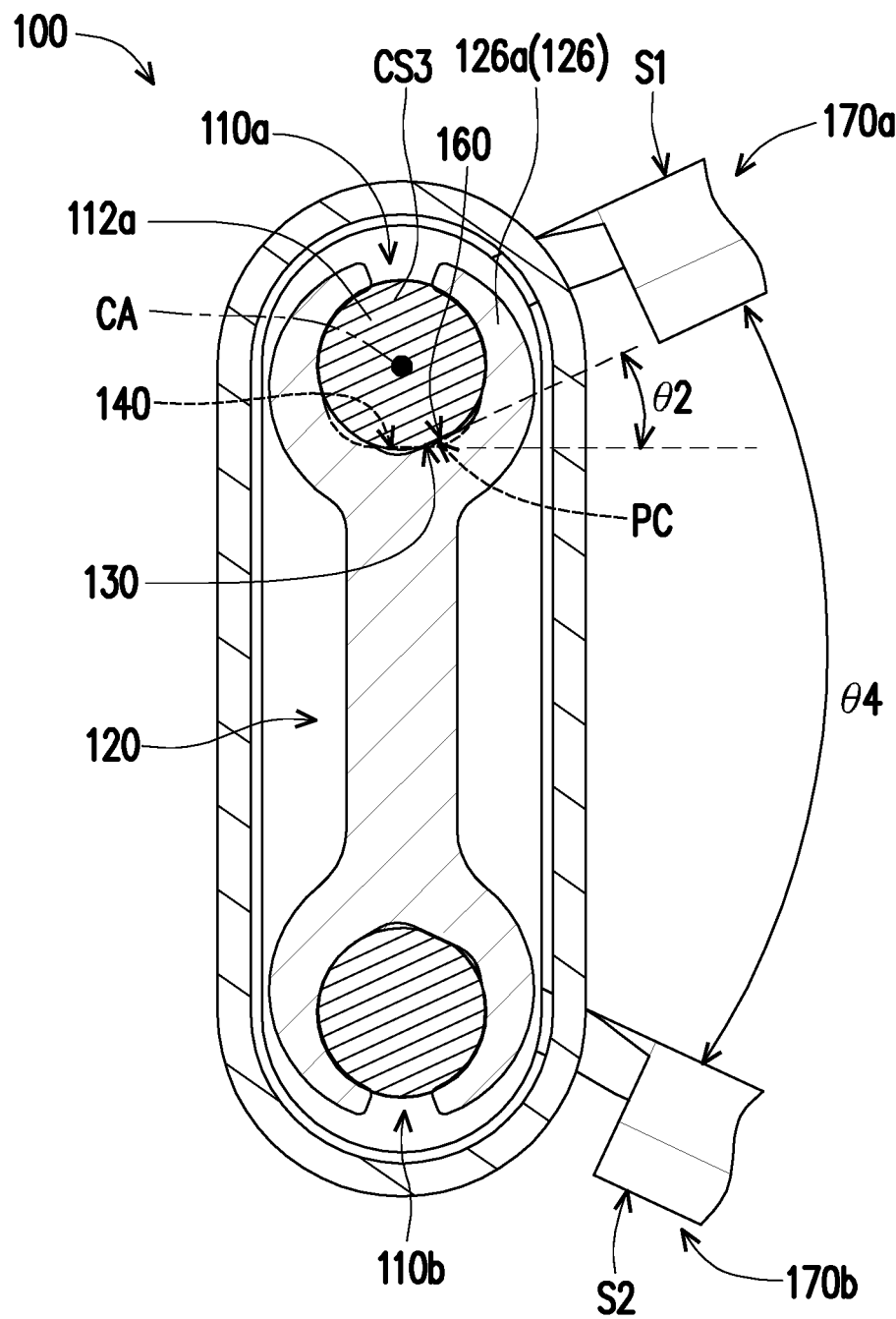
Figure 1E:
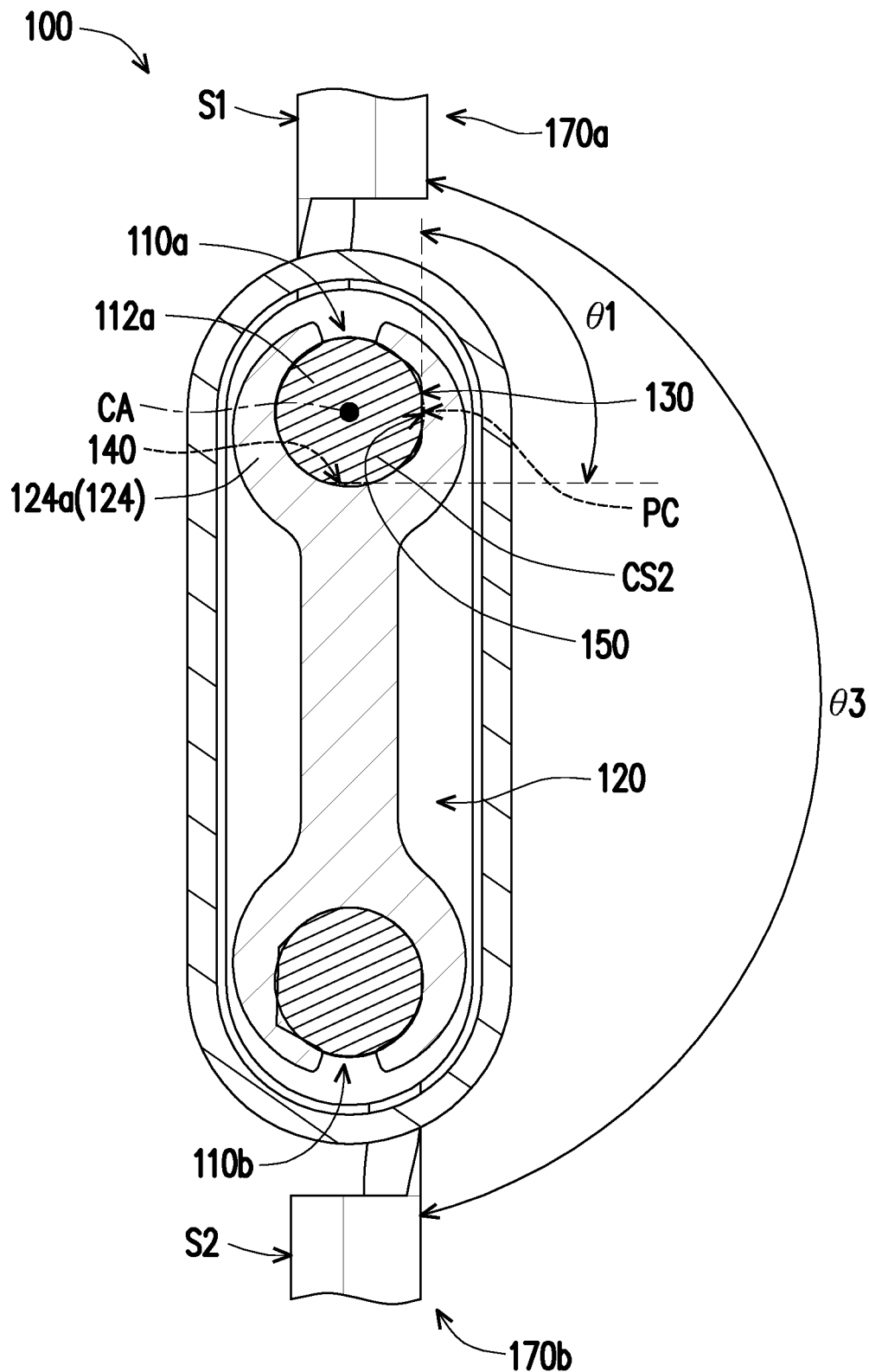

FIG. 1C to FIG. 1E illustrate an operation flow of the torque hinge module of FIG. 1A. Referring to FIG. 1A to FIG. 1E, the rotating element 110a has a shaft portion 112a and a first bearing surface 130.

The first torque element 122 has a first sleeve portion 122a and a second bearing surface 140. The second torque element 124 has a second sleeve portion 124a and a third bearing surface 150. The third torque element 126 has a third sleeve portion 126a and a fourth bearing surface 160.

The first sleeve portion 122a, the second sleeve portion 124a, and the third sleeve portion 126a are all sleeved on the shaft portion 112a.

There is a first included angle θ1 between a plane where the second bearing surface 140 is located and a plane where the third bearing surface 150 is located. There is a second included angle θ2 between the plane where the second bearing surface 140 is located and a plane where the fourth bearing surface 160 is located.

A shape of the first bearing surface 130 corresponds to a shape of the second bearing surface 140. The shape of the first bearing surface 130 corresponds to a shape of the third bearing surface 150. The shape of the first bearing surface 130 corresponds to a shape of the fourth bearing surface 160.

In an embodiment, shapes of the first sleeve portion, the second sleeve portion, and the third sleeve portion may also be changed as required. For example, the first sleeve portion, the second sleeve portion, and the third sleeve portion are in shapes without notches at end portions, and may respectively have a bearing surface at any position.

In an embodiment, according to actual requirements, the torque assembly may include more or fewer different torque elements, and the different torque elements may have bearing surfaces with different configuration angles to interact with the first bearing surface, such that the planes of the two brackets may be unfolded to a specific angle relative to each other.

Referring to FIG. 1B to FIG. 1E for comparison, the rotating element 110a has the shaft portion 112a. In order to accurately define a relationship between the first bearing surface 130, the second bearing surface 140, the third bearing surface 150, the fourth bearing surface 160 and the rotating element 110a, a cross section CS1 is defined at the shaft portion 112a of FIG. 1C, and a cross section CS2 is defined at the shaft portion 112a in FIG. 1E, and a cross section CS3 is defined at the shaft portion 112a in FIG. 1D.

The cross section CS1, the cross section CS2, and the cross section CS3 are all perpendicular to the central axis CA of the shaft portion 112a. In FIG. 1C, FIG. 1D, and FIG. 1E, a perfect circle PC is defined by an outermost periphery of the shaft portion 112a. Orthographic projections of the first bearing surface 130, the second bearing surface 140, the third bearing surface 150 and the fourth bearing surface 160 on the cross section CS1, the cross section CS2 and the cross section CS3 are located within the perfect circle PC.

In other words, the first bearing surface 130 is a plane recessed in the rotating element 110a. The second bearing surface 140 is a plane protruding from the first sleeve portion 122a. The third bearing surface 150 is a plane protruding from the second sleeve portion 124a. The fourth bearing surface 160 is a plane protruding from the third sleeve portion 126a.

As shown in FIG. 1C, when the surface S1 of the bracket 170a and the surface S2 of the bracket 170b are arranged up and down and parallel to each other, the first bearing surface 130 bears against the second bearing surface 140.

At this time, since the first bearing surface 130 and the second bearing surface 140 bear against each other, excessive torque may not be accumulated between the rotating element 110a and the first sleeve portion 122a of the first torque element 122, and the torque may be reduced, so that the rotating element 110a does not have a tendency to rotate in a certain direction, and the surface S1 and the surface S2 may be accurately positioned in up-down arrangement and mutually parallel positions.

As shown in FIG. 1D, when the surface S1 of the bracket 170a is unfolded by a fourth included angle θ4 relative to the surface S2 of the bracket 170b, the first bearing surface 130 bears against the fourth bearing surface 160.

At this time, since there is the second included angle θ2 between the second bearing surface 140 and the fourth bearing surface 160, when the first bearing surface 130 is changed from bearing against the second bearing surface 140 to bearing against the fourth bearing surface 160, the rotating element 110a is rotated by the second included angle θ2.

A value of the second included angle θ2 is, for example, but not limited to, 25 degrees. At this time, since the first bearing surface 130 and the fourth bearing surface 160 bear against each other, excessive torque may not be accumulated between the rotating element 110a and the third sleeve portion 126a of the third torque element 126, and the torque may be reduced, so that the rotating element 110a does not have a tendency to rotate in a certain direction, and the surface S1 and the surface S2 may be accurately positioned at positions corresponding to the fourth included angle θ4.

In an embodiment, the value of the second included angle θ2 may be selected according to actual requirements, and the value of the second included angle θ2 may be selected from a range of 10 degrees to 70 degrees according to actual requirements.

Referring to FIG. 1A and FIG. 1B, the synchronization mechanism 180 includes a driving gear 182a, a driving gear 182b, a synchronization gear 184a, and a synchronization gear 184b.

The driving gear 182a is fixed to the rotating element 110a to pivot in synchronization with the rotating element 110a. The driving gear 182b is fixed to the rotating element 110b to pivot in synchronization with the rotating element 110b. The synchronization gear 184a meshes with the driving gear 182a. The synchronization gear 184b meshes with the driving gear 182b and the synchronization gear 184a at the same time.

In other words, when the bracket 170a drives the rotating element 110a to rotate by the second included angle θ2, the rotating element 110a makes the driving gear 182a synchronously rotate by the second included angle θ2. At the same time, the driving gear 182a drives the rotating element 110b to rotate by the same second included angle θ2 through functions of the synchronization gear 184a, the synchronization gear 184b, and the driving gear 182b.

Therefore, the fourth included angle θ4 at which the bracket 170a is unfolded relative to the bracket 170b is substantially equal to twice of the second included angle θ2. Namely, θ4=2θ2. A value of the fourth included angle θ4 is, for example, but not limited to, 50 degrees.

In an embodiment, the value of the fourth included angle θ4 may be selected according to actual requirements, and the value of the fourth included angle θ4 may be selected from a range of 20 degrees to 140 degrees according to actual requirements.

As shown in FIG. 1E, when the surface S1 of the bracket 170a is unfolded by a third included angle θ3 relative to the surface S2 of the bracket 170b, the first bearing surface 130 bears against the third bearing surface 150.

At this time, since there is the first included angle θ1 between the second bearing surface 140 and the third bearing surface 150, when the first bearing surface 130 is changed from bearing against the second bearing surface 140 to bearing against the third bearing surface 160, the rotating element 110a is rotated by the first included angle θ1. A value of the first included angle θ1 is, for example, but not limited to, 90 degrees.

Figure 1F:
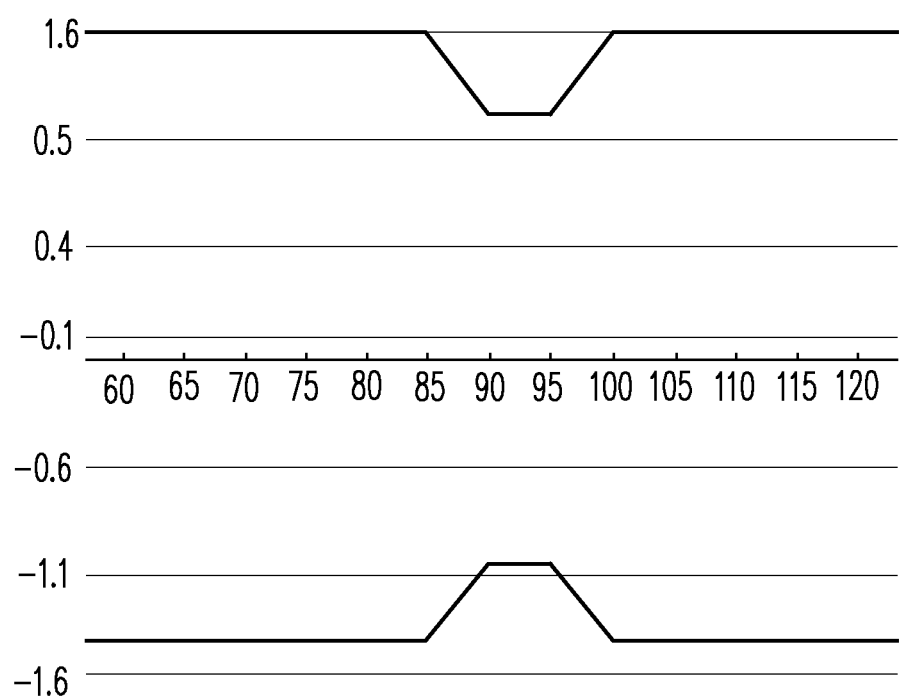
FIG. 1F shows torque generated by the torque hinge module in a state of FIG. 1E.

FIG. 1F shows the torque generated by the torque hinge module in the state of FIG. 1E. Referring to FIG. 1E and FIG. 1F, at this time, since the first bearing surface 130 and the third bearing surface 150 bear against each other, excessive torque may not be accumulated between the rotating element 110a and the second sleeve portion 126a of the second torque element 124, and the torque may be reduced, so that the rotating element 110a does not have a tendency to rotate in a certain direction, and the surface S1 and the surface S2 may be accurately positioned at positions corresponding to the third included angle θ3.

To be specific, a depression of a torque curve as shown in FIG. 1F indicates that a torque value between the rotating element 110a and the second sleeve portion 124a of the second torque element 124 is decreased at the first included angle θ1.

Similarly, the value of the third included angle θ3 is, for example, but not limited to twice of the first included angle θ1, i.e., for example, but not limited to, 180 degrees.

In the torque hinge module 100 of the disclosure, by making the first bearing surface 130 bear against the third bearing surface 150, the torque generated when the second torque element 124 is sleeved on the rotating element 110a may be reduced, which helps to make the surface S1 of the bracket 170a in the torque hinge module 100 accurately unfolded to an angle of 180 degrees with respect to the surface S2 of the bracket 170b. In other words, the inner surface 52a of the first body 52 and the inner surface 54a of the second body 54 in the folding electronic device 50 of FIG. 1A may be accurately unfolded to an angle of 180 degrees to provide the user with a better usage experience.

Figure 2A:
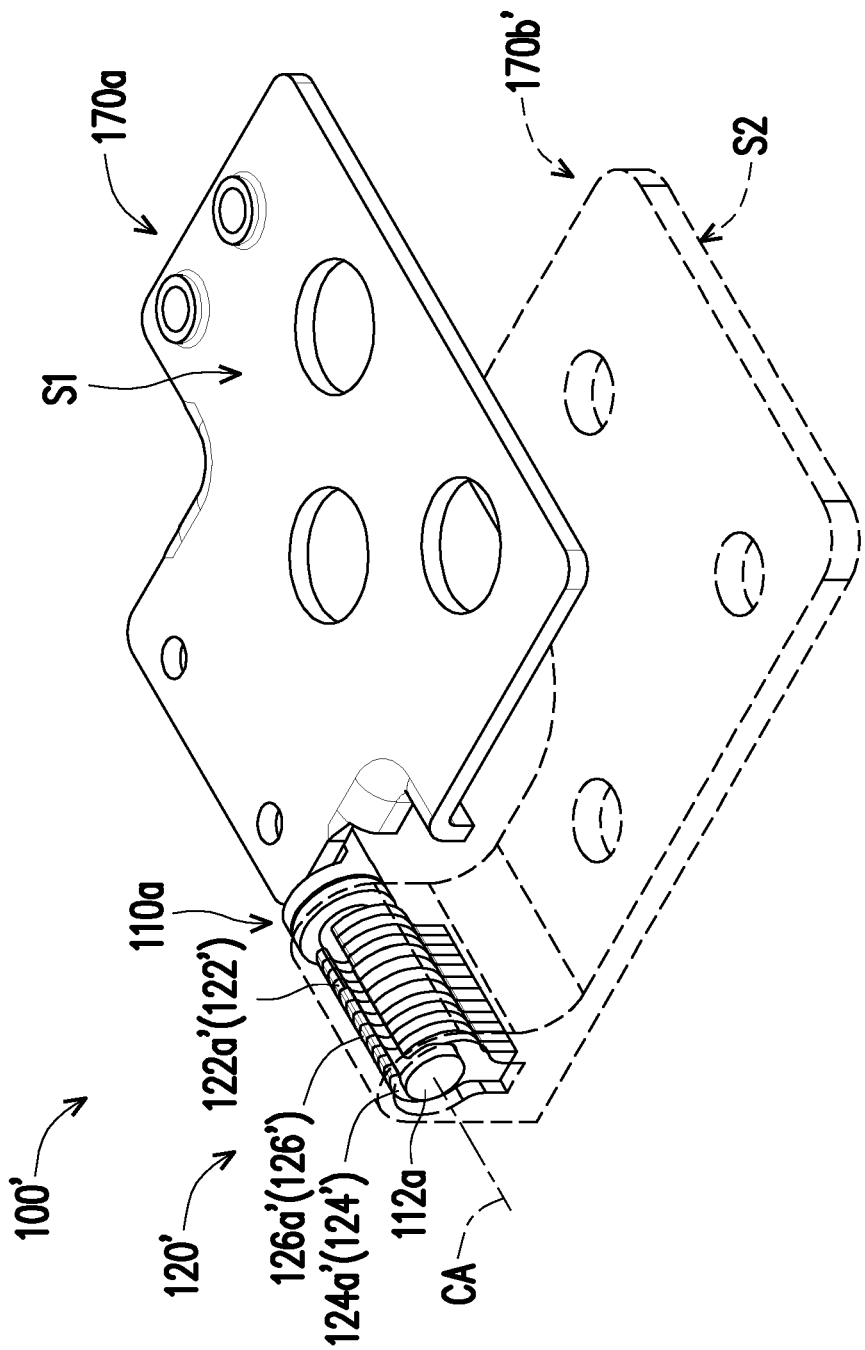
FIG. 2A is a schematic diagram of a torque hinge module according to an embodiment of the disclosure.
Figure 2B:
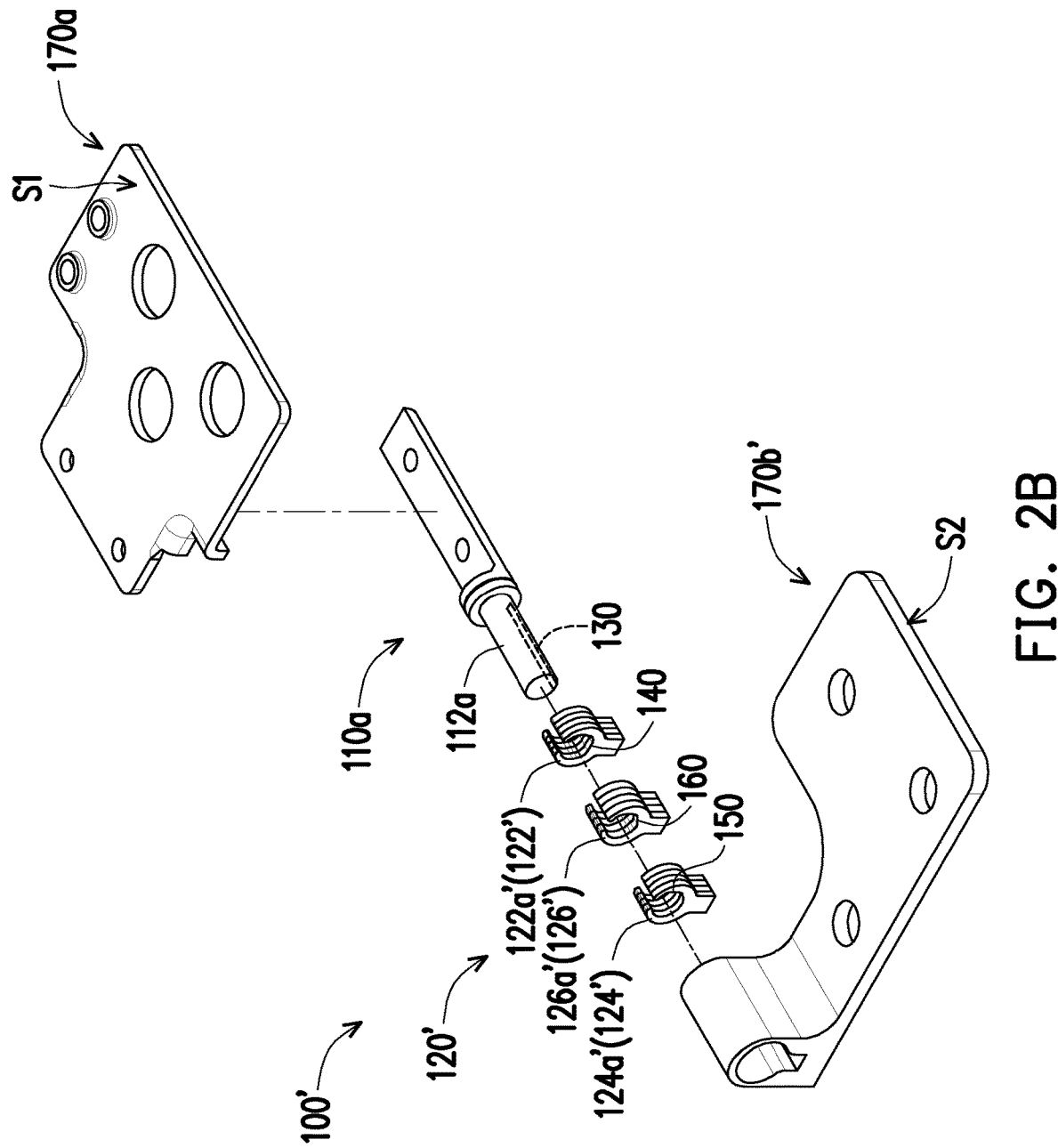
FIG. 2B is an exploded view of the torque hinge module of FIG. 2A.
Figure 2C:
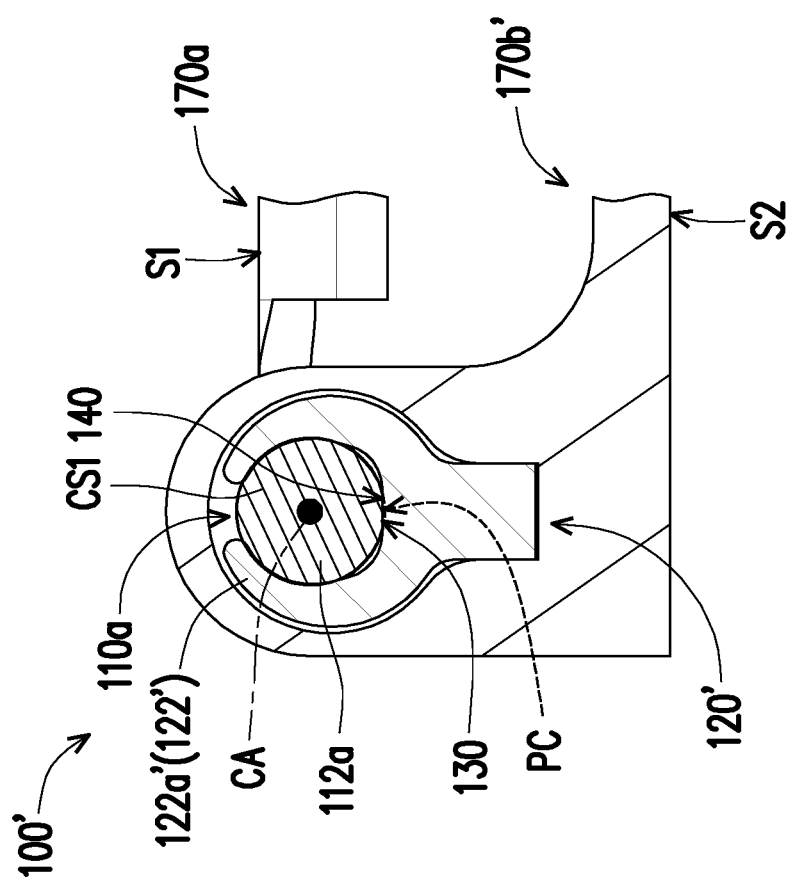
FIG. 2C to FIG. 2E illustrate an operation flow of the torque hinge module of FIG. 2A.
Figure 2D:
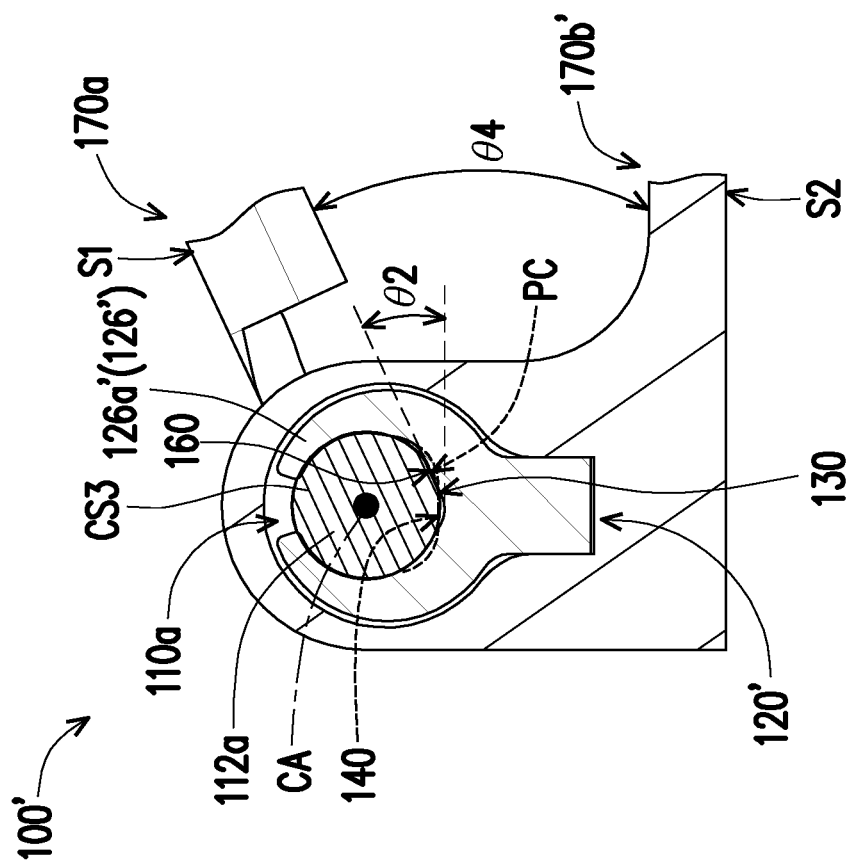
Figure 2E:
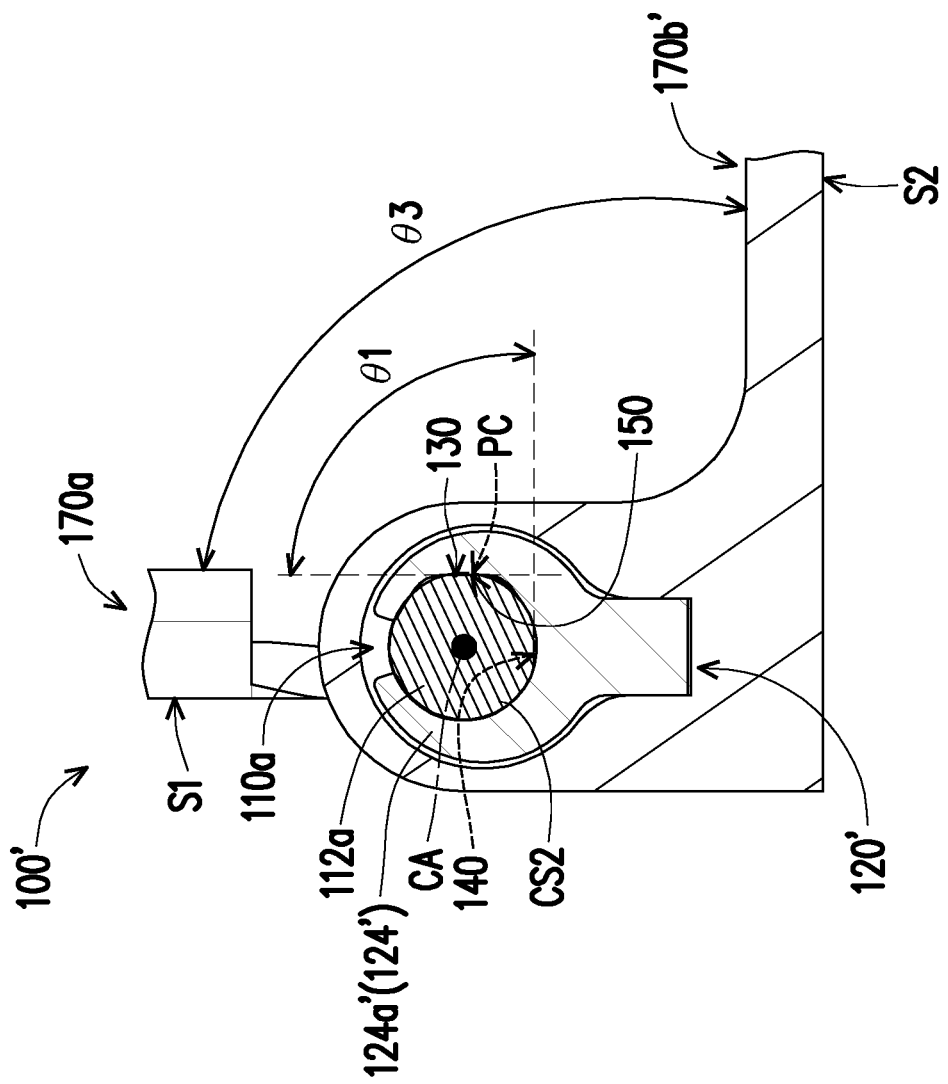

FIG. 2A is a schematic diagram of a torque hinge module according to an embodiment of the disclosure. FIG. 2B is an exploded view of the torque hinge module of FIG. 2A. FIG. 2C to FIG. 2E illustrate an operation flow of the torque hinge module of FIG. 2A.

In a torque hinge module 100' shown in FIG. 2A to FIG. 2E, configurations and functions of a torque assembly 120', a first torque element 122', a first sleeve portion 122a', a second torque element 124', a second sleeve portion 124a', a third torque element 126', and a third sleeve portion 1246' are similar to configurations and functions of the torque assembly 120, the first torque element 122, the first sleeve portion 122a, the second torque element 124, the second sleeve portion 124a, the third torque element 126, and the third sleeve portion 1246 in the torque hinge module 100 of FIG. 1A to FIG. 1E, and details thereof are not repeated.

A difference between the torque hinge module 100' shown in FIG. 2A to FIG. 2E and the torque hinge module 100 shown in FIG. 1A to FIG. 1E is that the torque assembly 120' only has the first bearing surface 130, the second bearing surface 140, the third bearing surface 150 and the fourth bearing surface 160 corresponds to the single rotating element 110a.

The torque hinge module 100' further includes a bracket 170b'. The bracket 170a is also fixed to the rotating element 110a, and the bracket 170b' sleeves the torque assembly 120'.

In other words, the disclosure provides a uniaxial torque hinge module 100'. Therefore, the third included angle θ3 between the surface S1 of the bracket 170a and the surface S2 of the bracket 170b' may be equal to the first included angle θ1, and the fourth included angle θ4 between the surface S1 of the bracket 170a and the surface S2 of the bracket 170b' may be equal to the second included angle θ2.

It should be particularly noted that the disclosure here only illustrates that the torsion shaft module 100' is a uniaxial type. Those skilled in the art should understand that in order to ensure that the surface S1 of the bracket 170a is unfolded at an angle of 180 degrees relative to the surface S2 of the bracket 170b', and the second sleeve portion 124a' may be appropriately changed in design to become a shape without a notch, and the third bearing surface may be designed to have an included angle of 180 degrees relative to the second bearing surface.

Figure 3A:
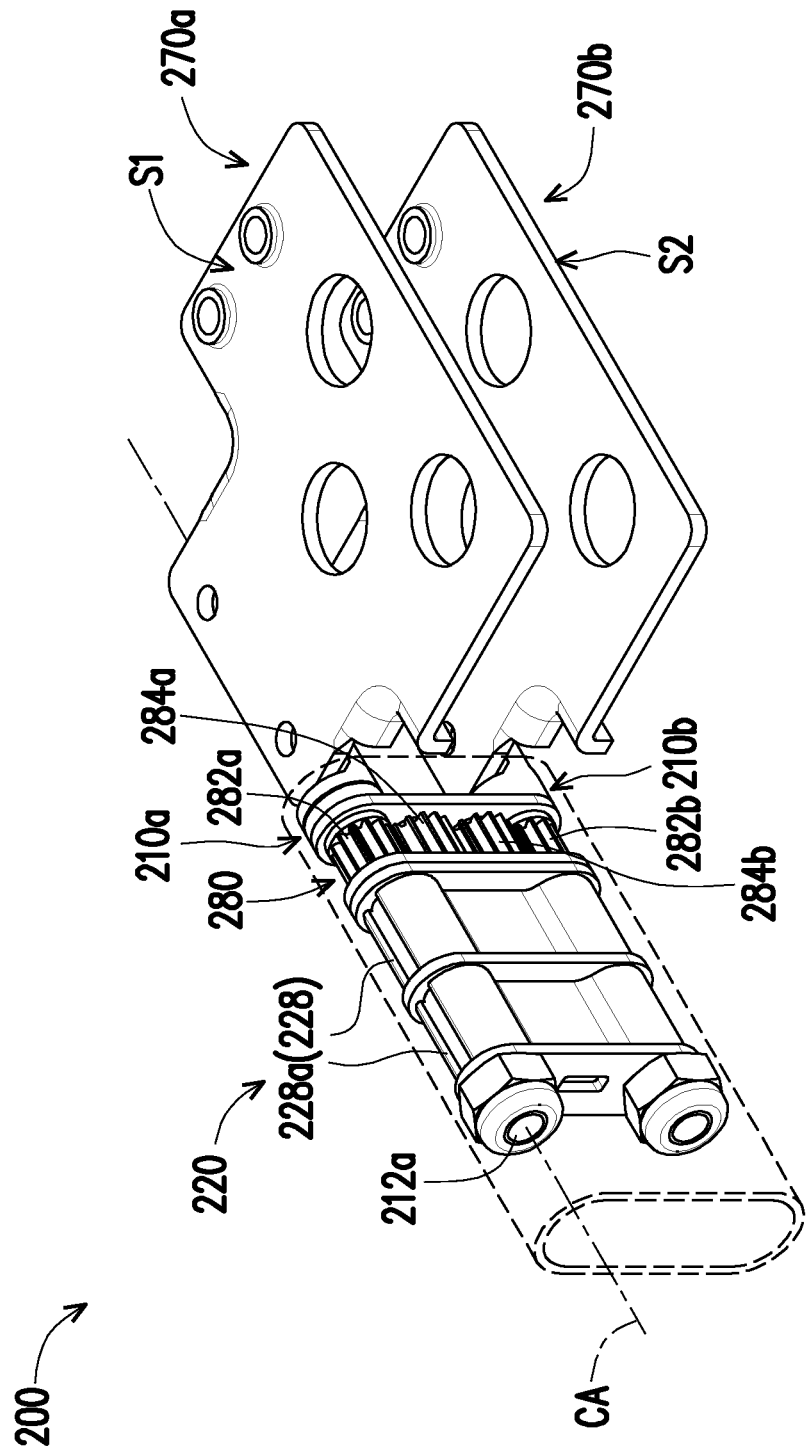
FIG. 3A is a schematic diagram of a torque hinge module according to an embodiment of the disclosure.
Figure 3B:
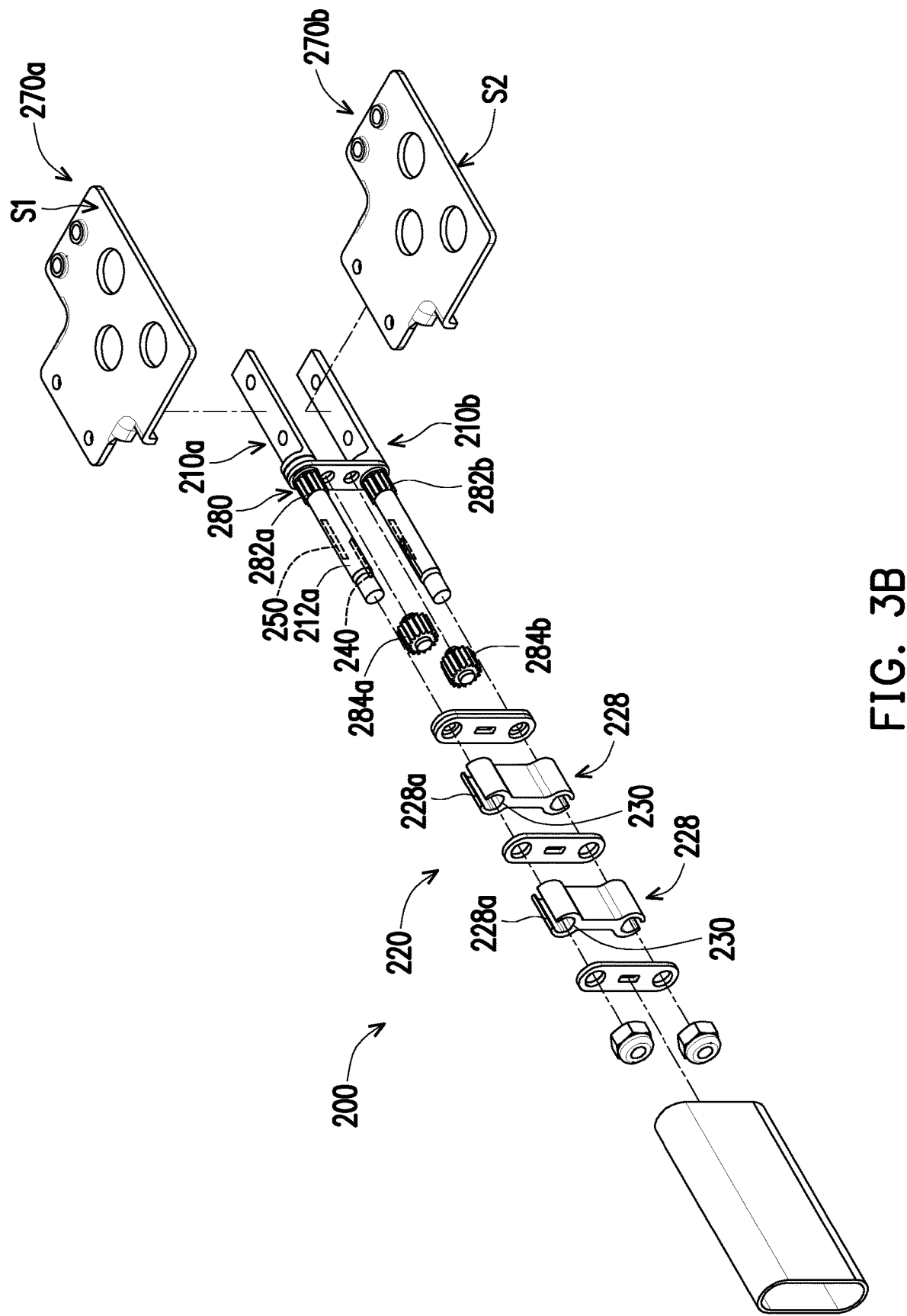
FIG. 3B is an exploded view of the torque hinge module of FIG. 3A.
Figure 3C:
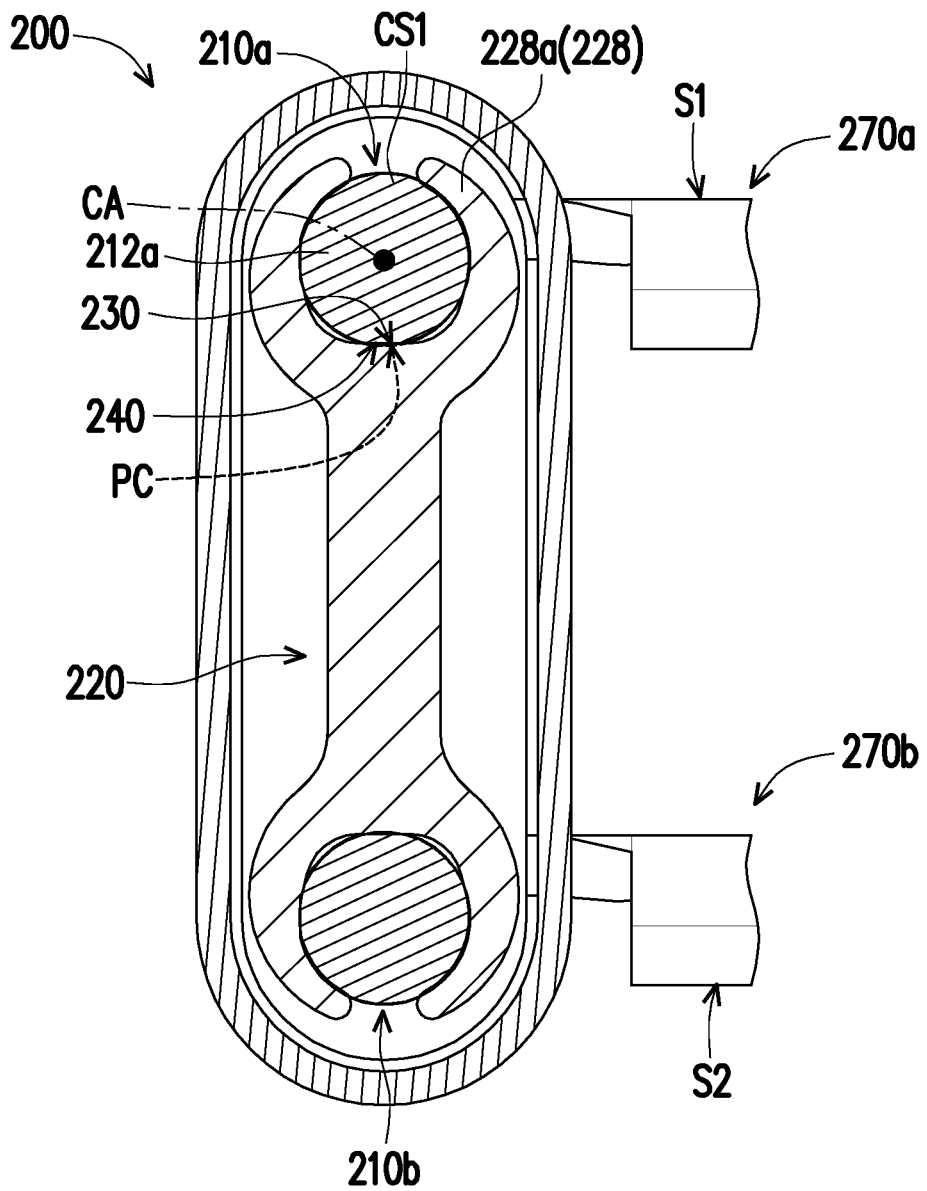
FIG. 3C and FIG. 3D illustrate an operation flow of the torque hinge module of FIG. 3A.
Figure 3D:
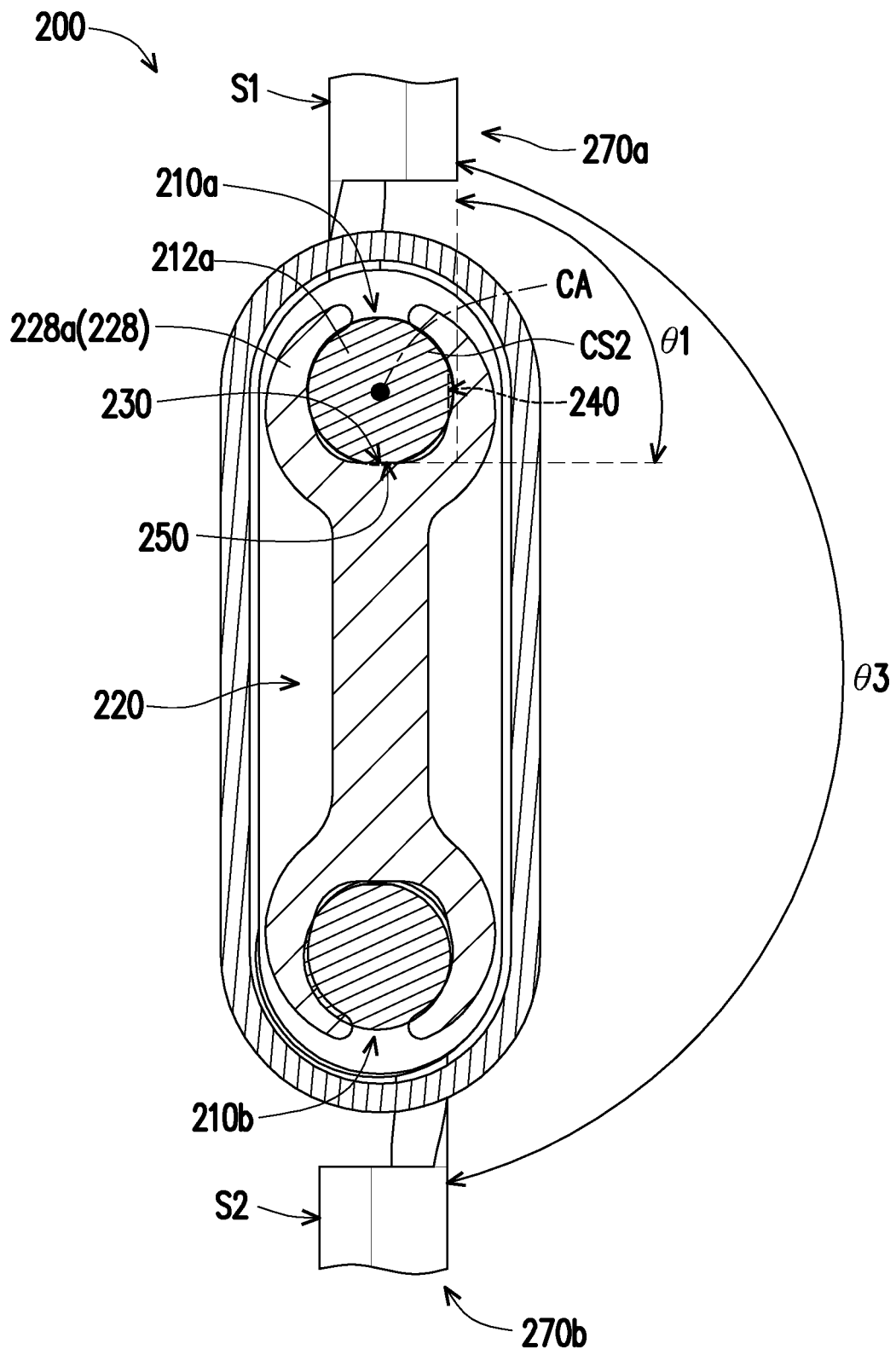

FIG. 3A is a schematic diagram of a torque hinge module according to an embodiment of the disclosure. FIG. 3B is an exploded view of the torque hinge module of FIG. 3A. FIG. 3C and FIG. 3D illustrate an operation flow of the torque hinge module of FIG. 3A.

In a torque hinge module 200 shown in FIG. 3A to FIG. 3D, configurations and functions of a first bearing surface 230, a second bearing surface 240, a third bearing surface 250, a bracket 270a, a bracket 270b, a synchronization mechanism 280, a driving gear 282a, a driving gear 282b, a synchronization gear 284a, and a synchronization gear 284b are similar to configurations and functions of the first bearing surface 130, the second bearing surface 140, the third bearing surface 150, the bracket 170a, the bracket 170b, the synchronization mechanism 180, the driving gear 182a, the driving gear 182b, the synchronization gear 184a, and the synchronization gear 184b in the torque hinge module 100 of FIG. 1A to FIG. 1E, and details thereof are not repeated.

A difference between the torque hinge module 200 shown in FIG. 3A to FIG. 3D and the torque hinge module 100 shown in FIG. 1A to FIG. 1E is that a torque assembly 220, for example, but not limited to, includes two torque elements 228.

To be specific, each torque element 228 has a sleeve portion 228a and the first bearing surface 230. The rotating element 210a has a shaft portion 212a, the second bearing surface 240 and the third bearing surface 250. The configuration of the rotating element 210b is similar to that of the rotating element 210a, and detail thereof is not repeated.

The sleeve portion 228a is sleeved on the shaft portion 212a. As the shaft portion 212a rotates, one of the first bearing surfaces 230 may be selectively aligned with the second bearing surface 240 in position, or the other first bearing surface 230 may be selectively aligned with the third bearing surface 250 in position.

There is a first included angle θ1 between a plane where the second bearing surface 240 is located and a plane where the third bearing surface 250 is located. A shape of the first bearing surface 230 corresponds to a shape of the second bearing surface 240. The shape of the first bearing surface 230 corresponds to a shape of the third bearing surface 250.

In this way, in the torque hinge module 200 of the disclosure, by making one of the first bearing surfaces 230 bear against the second bearing surface 240 or the third bearing surface 250, the torque generated when the torque assembly 220 is sleeved on the rotating element 210a may be reduced, which helps to accurately fix the torque hinge module 200 at a specific angle.

Figure 4A:
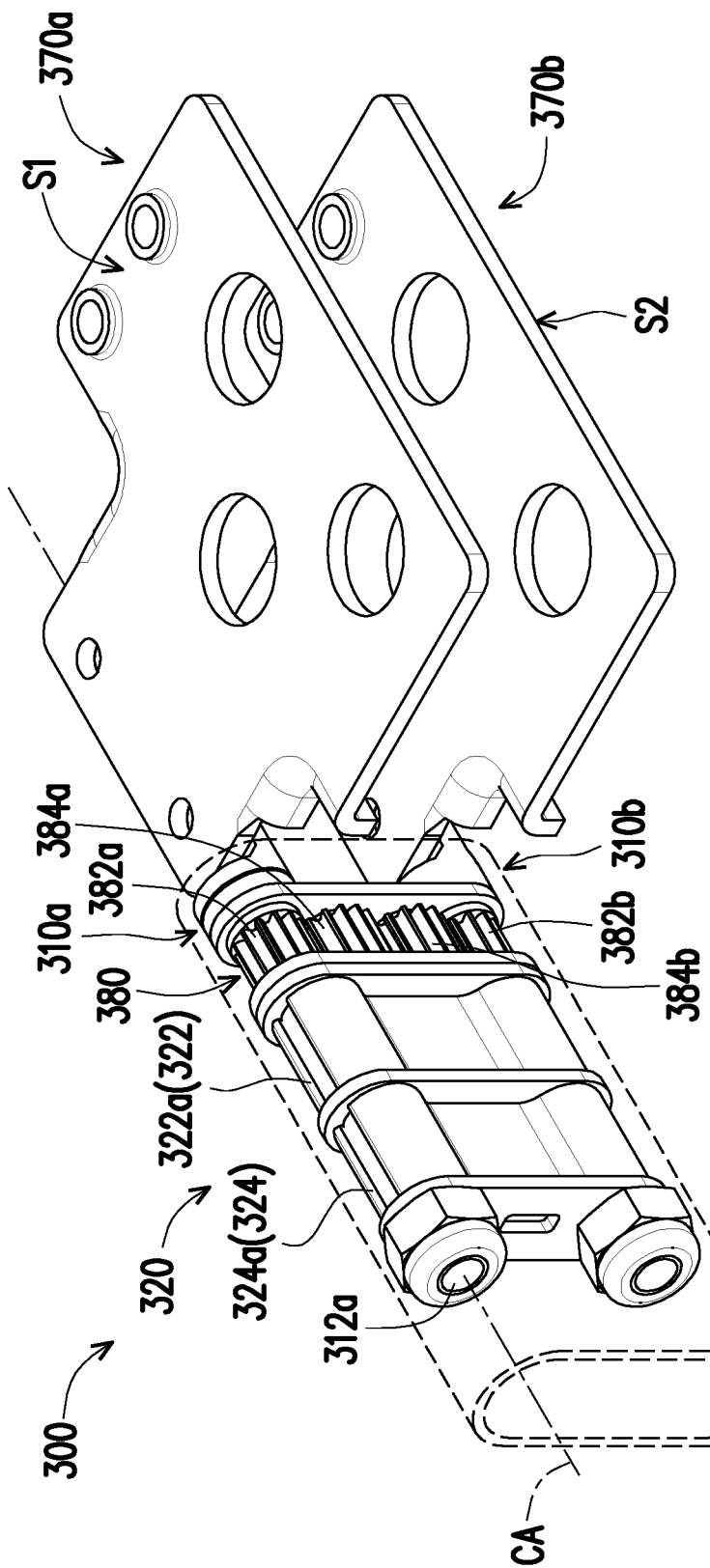
FIG. 4A is a schematic diagram of a torque hinge module according to an embodiment of the disclosure.
Figure 4B:
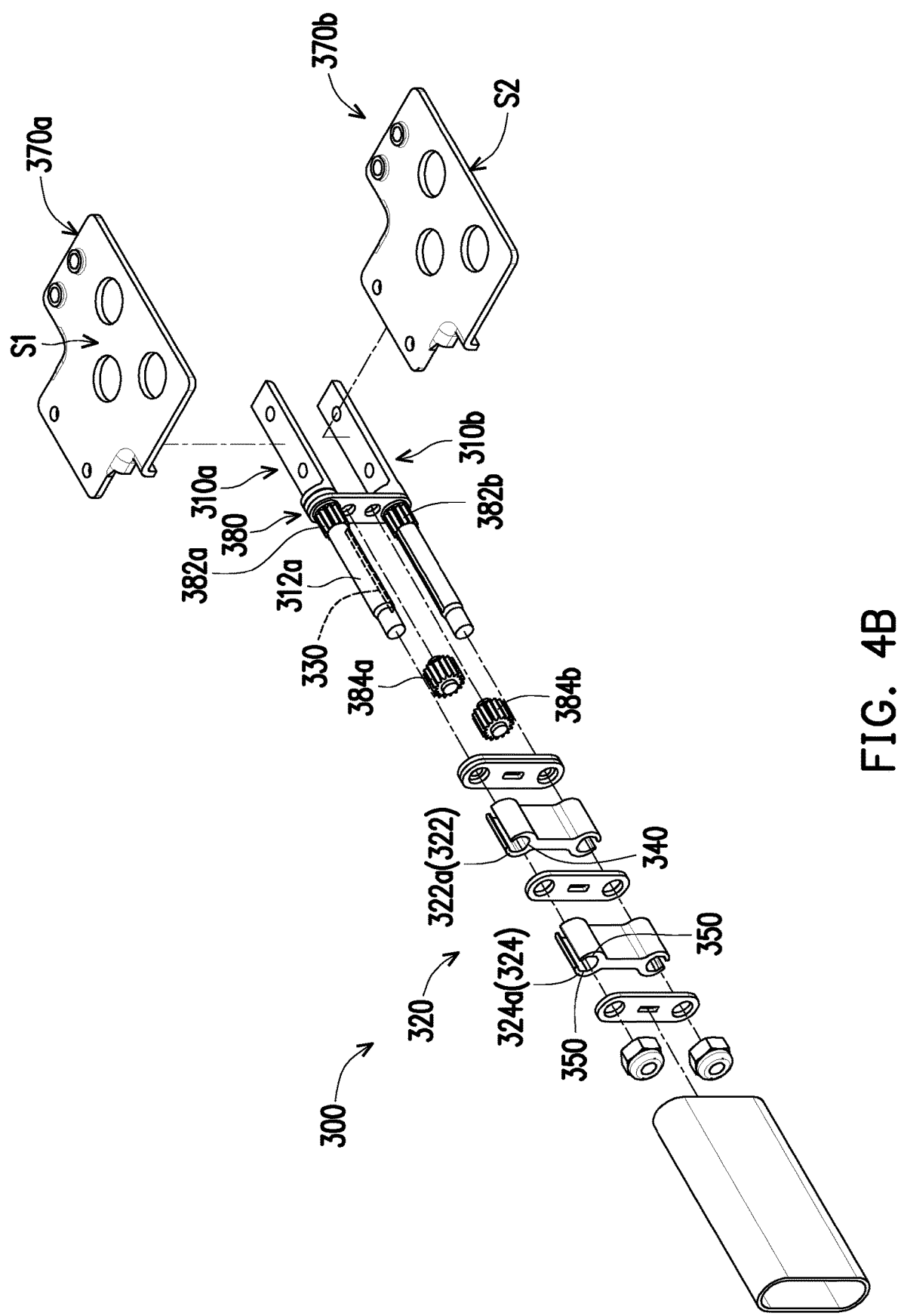
FIG. 4B is an exploded view of the torque hinge module of FIG. 4A.
Figure 4C:
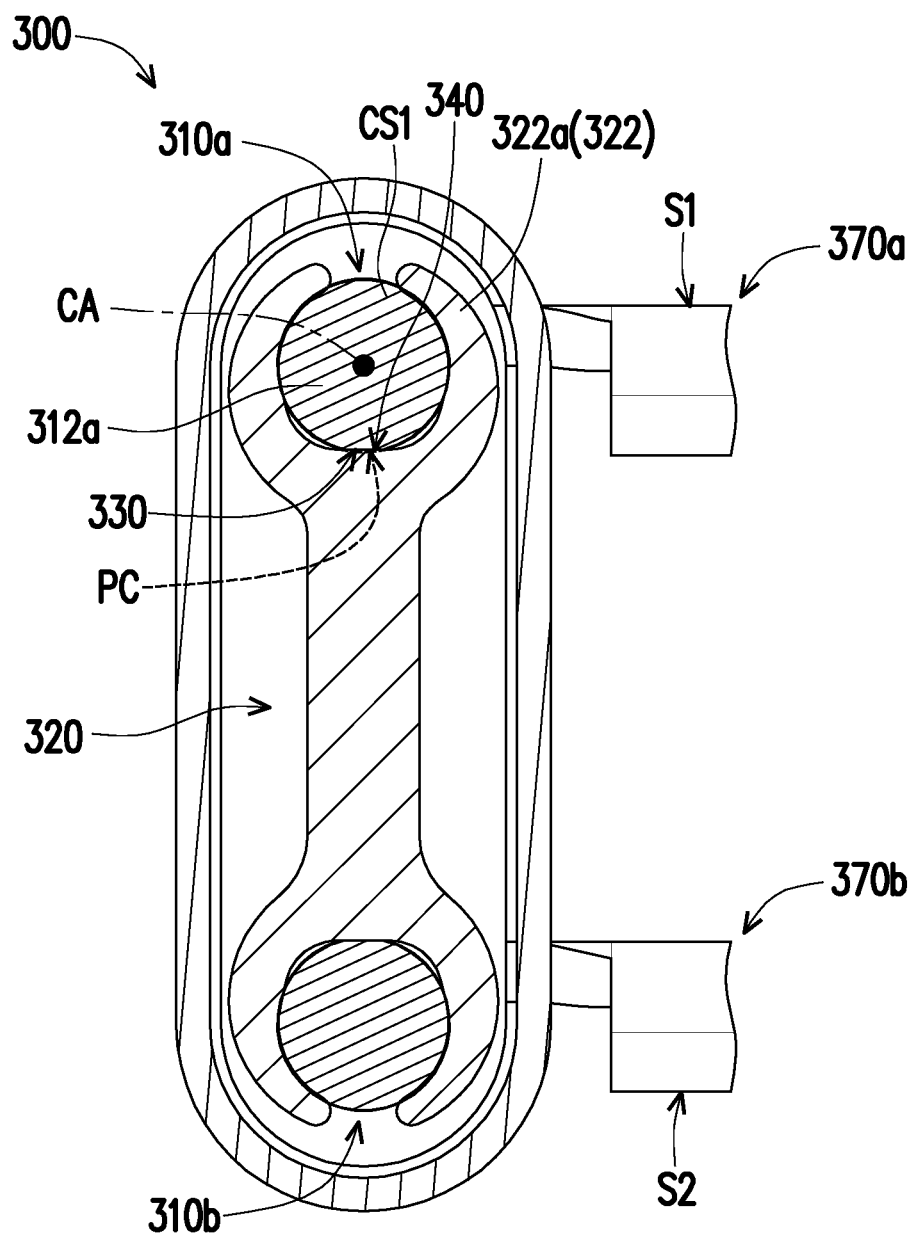
FIG. 4C and FIG. 4D illustrate an operation flow of the torque hinge module of FIG. 4A.
Figure 4D:
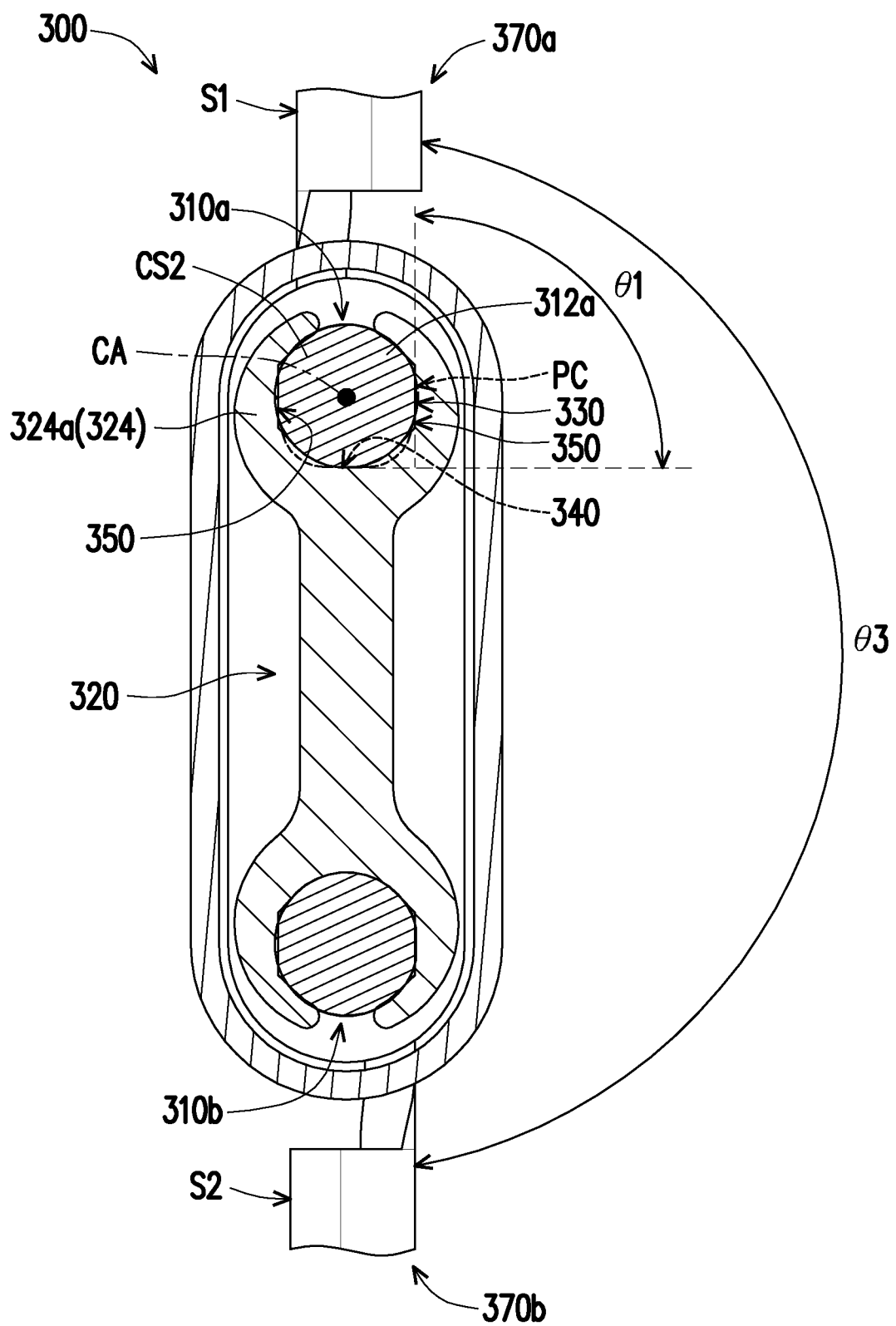

FIG. 4A is a schematic diagram of a torque hinge module according to an embodiment of the disclosure. FIG. 4B is an exploded view of the torque hinge module of FIG. 4A. FIG. 4C and FIG. 4D illustrate an operation flow of the torque hinge module of FIG. 4A.

In a torque hinge module 300 shown in FIG. 4A to FIG. 4D, configurations and functions of a first bearing surface 330, a second bearing surface 340, a third bearing surface 350, a bracket 370a, a bracket 370b, a synchronization mechanism 380, a driving gear 382a, a driving gear 382b, a synchronization gear 384a, and a synchronization gear 384b are similar to configurations and functions of the first bearing surface 130, the second bearing surface 140, the third bearing surface 150, the bracket 170a, the bracket 170b, the synchronization mechanism 180, the driving gear 182a, the driving gear 182b, the synchronization gear 184a, and the synchronization gear 184b in the torque hinge module 100 of FIG. 1A to FIG. 1E, and details thereof are not repeated.

A difference between the torque hinge module 300 shown in FIG. 4A to FIG. 4D and the torque hinge module 100 shown in FIG. 1A to FIG. 1E is that a torque assembly 320, for example, but not limited to, includes a first torque element 322 and a second torque element 324.

In detail, the rotating element 310a has a shaft portion 312a and the first bearing surface 330. The configuration of the rotating element 310b is similar to that of the rotating element 310a, and detail thereof is not repeated here. The first torque element 322 has a first sleeve portion 322a and the second bearing surface 340. The second torque element 324 has a second sleeve portion 324a and two third bearing surfaces 350.

The first sleeve portion 322a is sleeved on the shaft portion 312a, and the first bearing surface 330 may be selectively aligned with the second bearing surface 340 in position. The second sleeve portion 324a is sleeved on the shaft portion 312a, and the first bearing surface 330 may be selectively aligned with one of the third bearing surfaces 350 in position.

As shown in FIG. 4D, when the first bearing surface 330 bears against one of the third bearing surfaces 350, the other third bearing surface 350 may sandwich the shaft portion 312a to generate certain torsion, which may reduce a reduction amount of torque.

There is a first included angle θ1 between a plane where the second bearing surface 340 is located and a plane where the third bearing surface 350 is located. A shape of the first bearing surface 330 corresponds to a shape of the second bearing surface 340. The shape of the first bearing surface 330 corresponds to a shape of the third bearing surface 350.

In this way, in the torque hinge module 300 of the disclosure, by making the first bearing surfaces 330 bear against the second bearing surface 340 or the third bearing surface 350, the torque generated when the torque assembly 320 is sleeved on the rotating element 310a may be reduced, which helps to accurately fix the torque hinge module 300 at a specific angle.

Figure 5A:
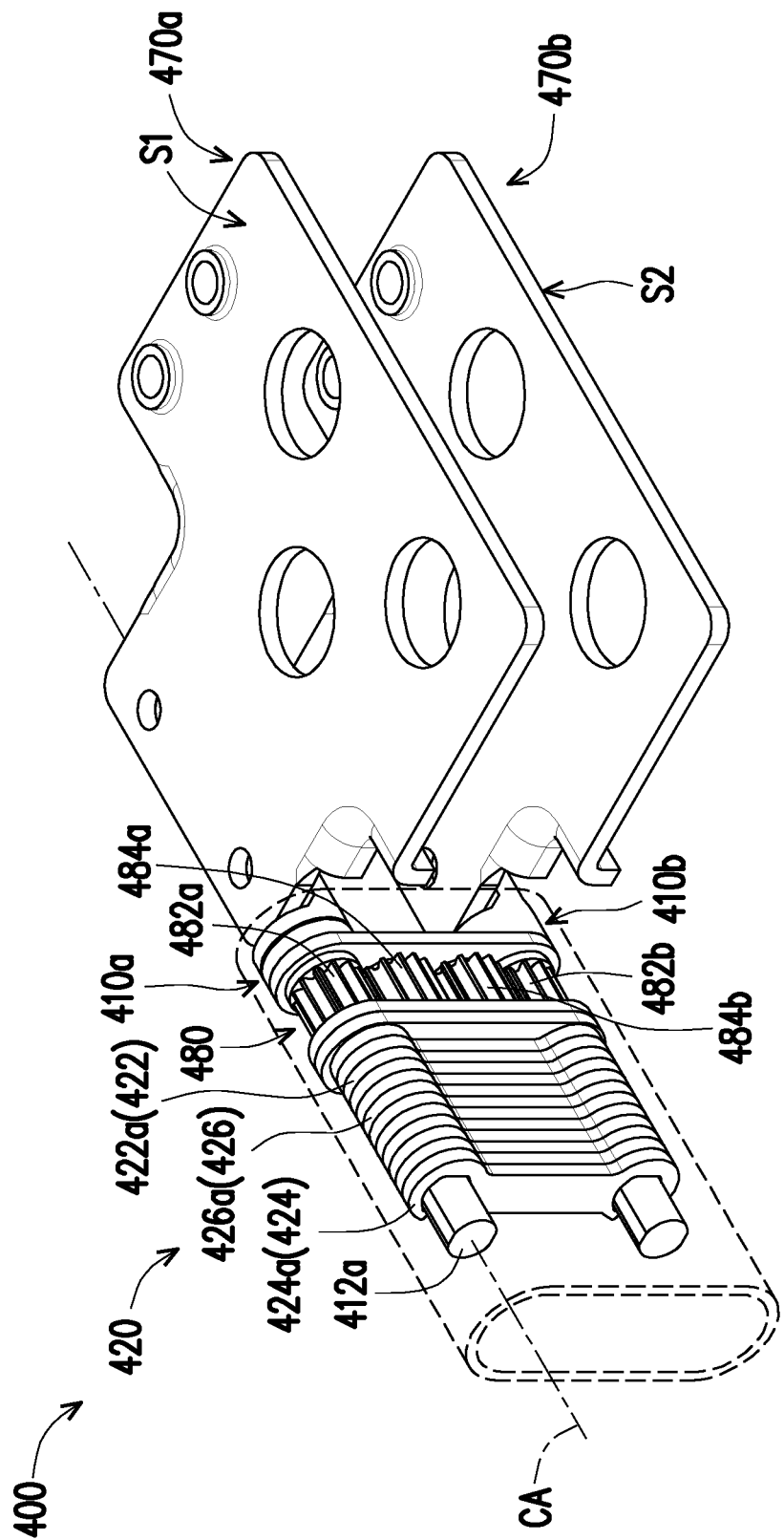
FIG. 5A is a schematic diagram of a torque hinge module according to an embodiment of the disclosure.
Figure 5B:
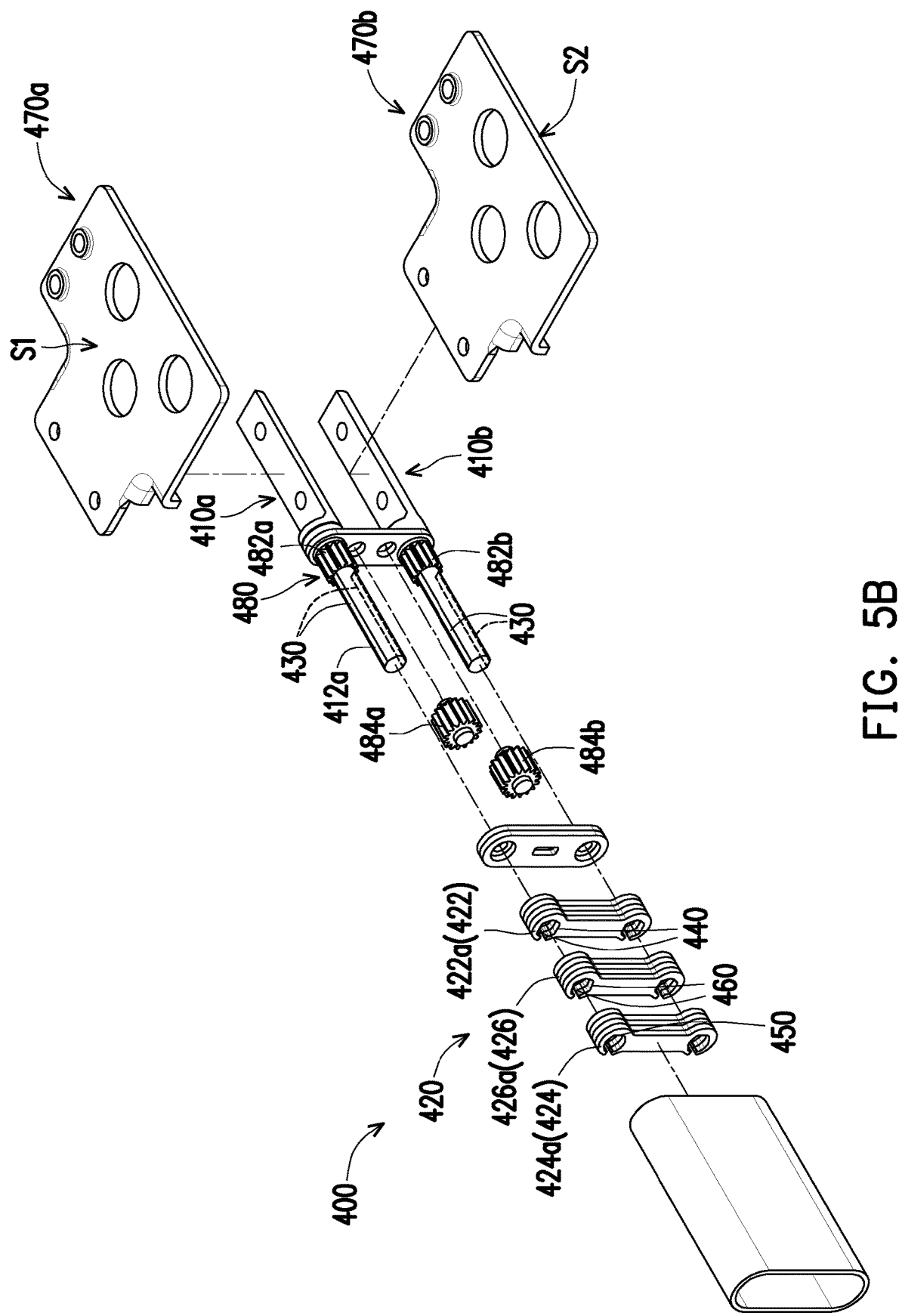
FIG. 5B is an exploded view of the torque hinge module of FIG. 5A.
Figure 5C:
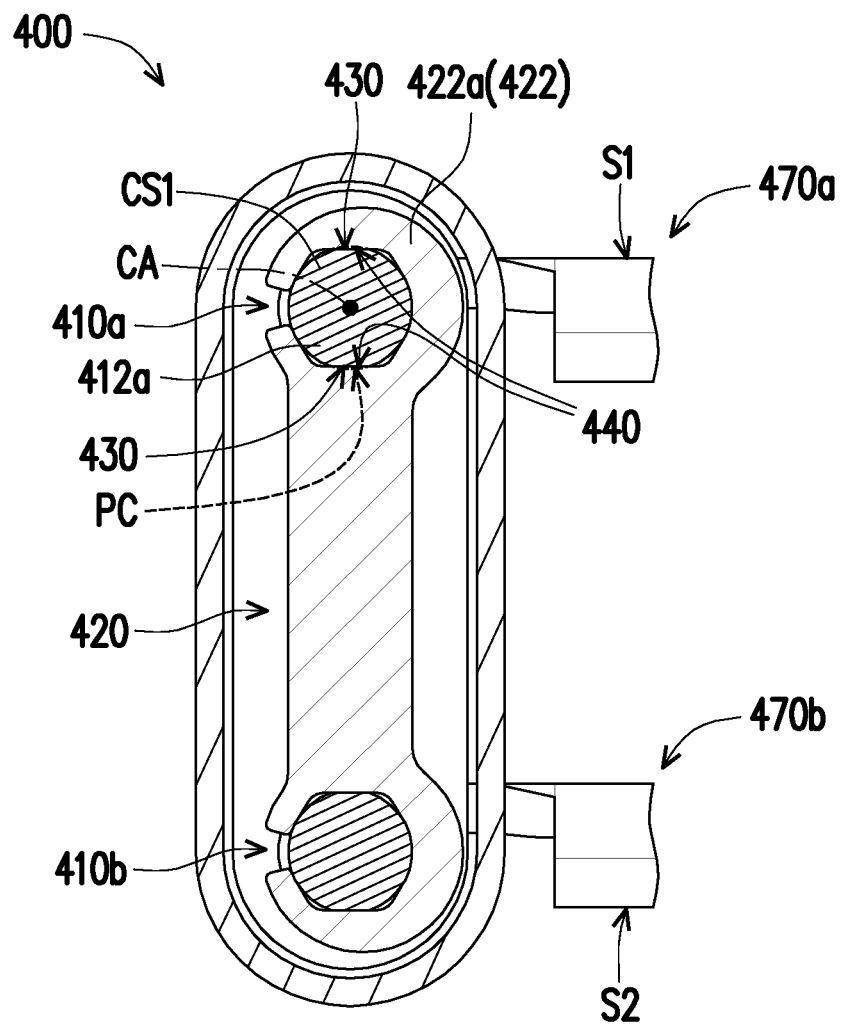
FIG. 5C to FIG. 5E illustrate an operation flow of the torque hinge module of FIG. 5A.
Figure 5D:
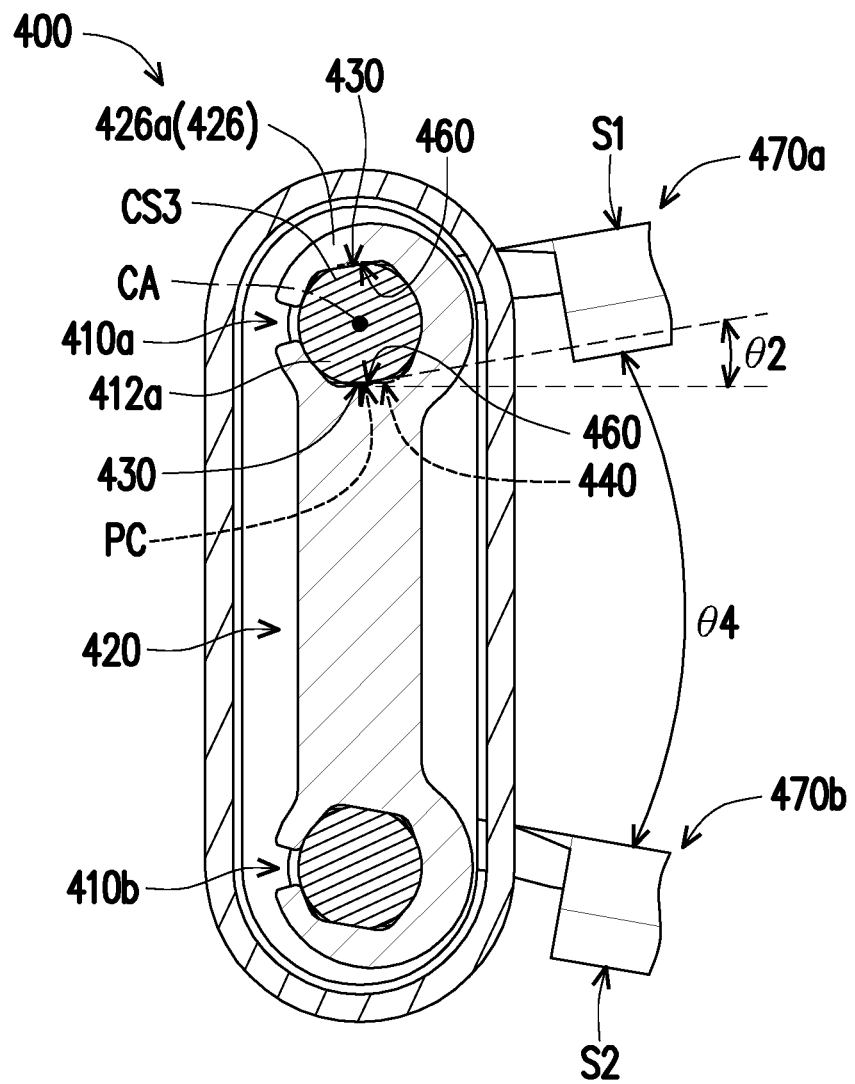
Figure 5E:
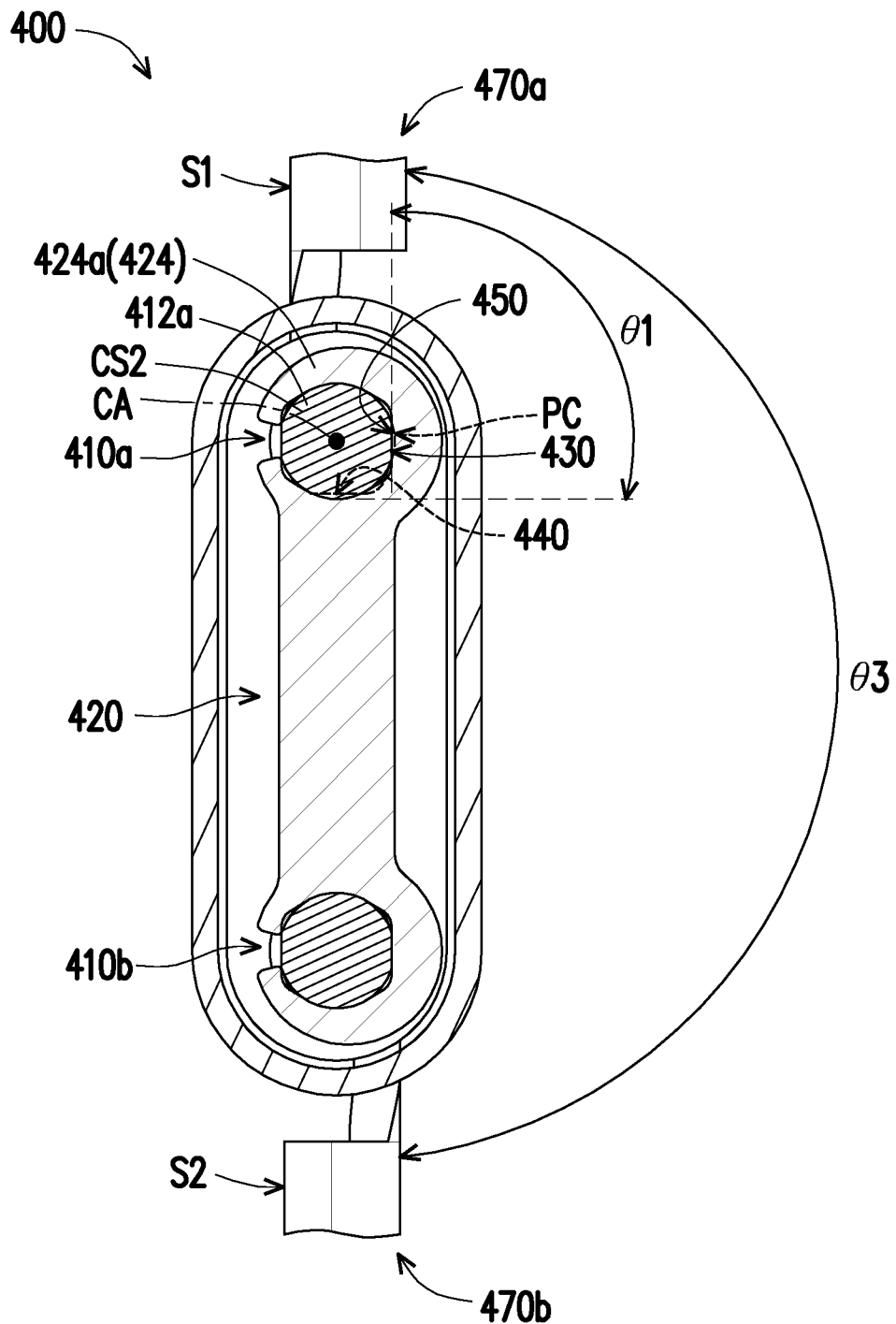

FIG. 5A is a schematic diagram of a torque hinge module according to an embodiment of the disclosure. FIG. 5B is an exploded view of the torque hinge module of FIG. 5A. FIG. 5C to FIG. 5E illustrate an operation flow of the torque hinge module of FIG. 5A.

In a torque hinge module 400 shown in FIG. 5A to FIG. 5E, configurations and functions of a first bearing surface 430, a second bearing surface 440, a third bearing surface 450, a fourth bearing surface 460, a bracket 470a, a bracket 470b, a synchronization mechanism 480, a driving gear 482a, a driving gear 482b, a synchronization gear 484a, and a synchronization gear 484b are similar to configurations and functions of the first bearing surface 130, the second bearing surface 140, the third bearing surface 150, the fourth bearing surface 160, the bracket 170a, the bracket 170b, the synchronization mechanism 180, the driving gear 182a, the driving gear 182b, the synchronization gear 184a, and the synchronization gear 184b in the torque hinge module 100 of FIG. 1A to FIG. 1E, and details thereof are not repeated.

A difference between the torque hinge module 400 shown in FIG. 5A to FIG. 5E and the torque hinge module 100 shown in FIG. 1A to FIG. 1E is that a torque assembly 420, for example, but not limited to, includes a first torque element 422, a second torque element 424 and a third torque element 426.

In detail, the rotating element 410a has a shaft portion 412a and two first bearing surfaces 430. The configuration of the rotating element 410b is similar to that of the rotating element 310a, and detail thereof is not repeated here. The first torque element 422 has a first sleeve portion 422a and two second bearing surfaces 440. The second torque element 424 has a second sleeve portion 424a and the third bearing surface 450. The third torque element 426 has a third sleeve portion 426a and two fourth bearing surfaces 460.

The notches of the first sleeve portion 422a, the second sleeve portion 424a, and the third sleeve portion 426a are located on the side. The first sleeve portion 422a is sleeved on the shaft portion 412a, and the two first bearing surfaces 430 may be selectively aligned with the two second bearing surfaces 440 in position. The second sleeve portion 424a is sleeved on the shaft portion 412a, and one of the first bearing surfaces 430 may be selectively aligned with the corresponding third bearing surface 450 in position. The third sleeve portion 426a is sleeved on the shaft portion 412a, and the two first bearing surfaces 430 may be selectively aligned with the two fourth bearing surfaces 460 in position.

There is a first included angle θ1 between a plane where the second bearing surface 440 is located and a plane where the third bearing surface 450 is located. There is a second included angle θ2 between the plane where the second bearing surface 440 is located and a plane where the fourth bearing surface 460 is located. A shape of the first bearing surface 430 corresponds to a shape of the second bearing surface 440. The shape of the first bearing surface 430 corresponds to a shape of the third bearing surface 450.

In this way, in the torque hinge module 400 of the disclosure, by making the first bearing surfaces 430 bear against the second bearing surfaces 440, the third bearing surface 350, or the fourth bearing surfaces 460, the torque generated when the torque assembly 420 is sleeved on the rotating element 410a may be reduced, which helps to accurately fix the torque hinge module 400 at a specific angle.

Figure 6A:
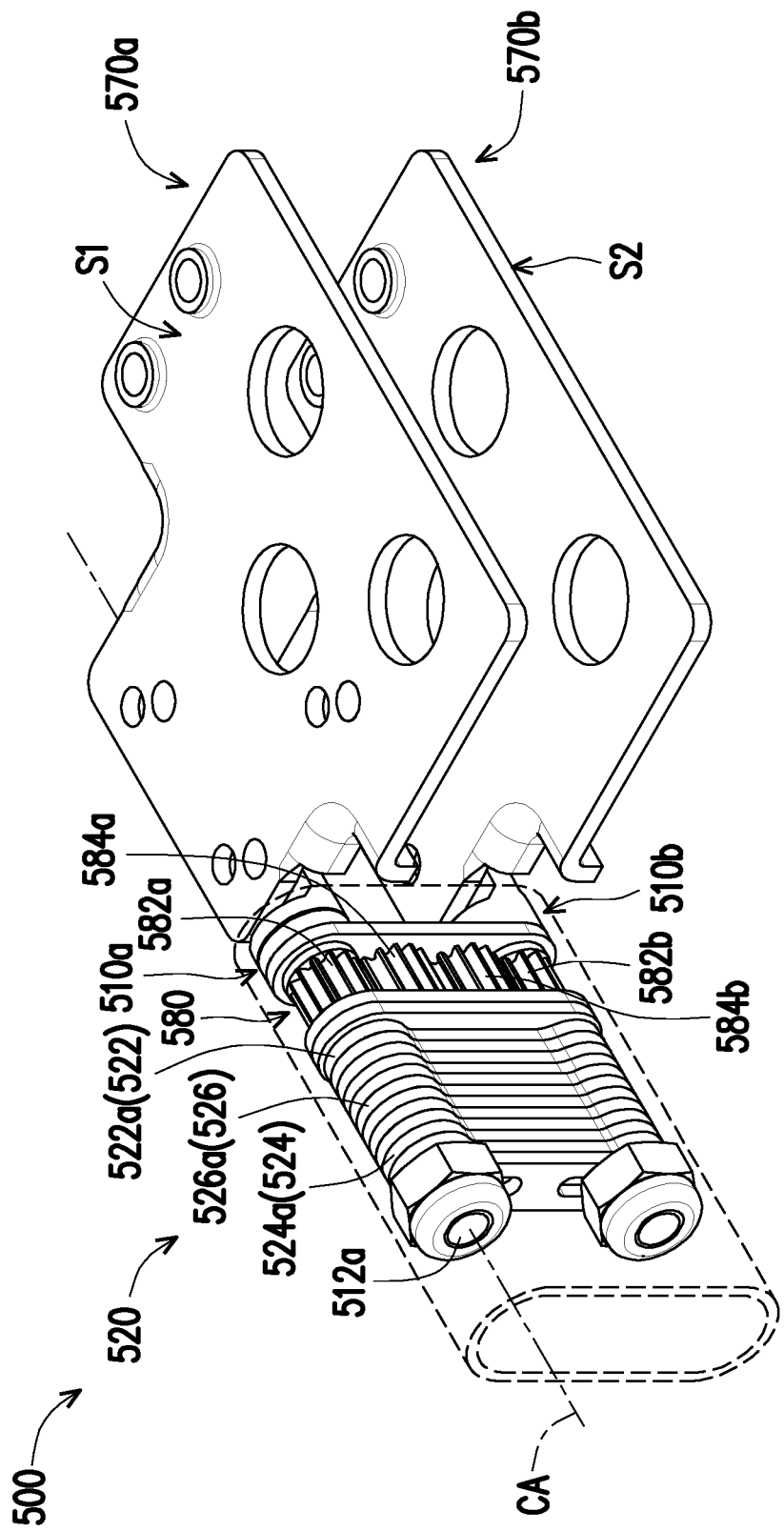
FIG. 6A is a schematic diagram of a torque hinge module according to an embodiment of the disclosure.
Figure 6B:
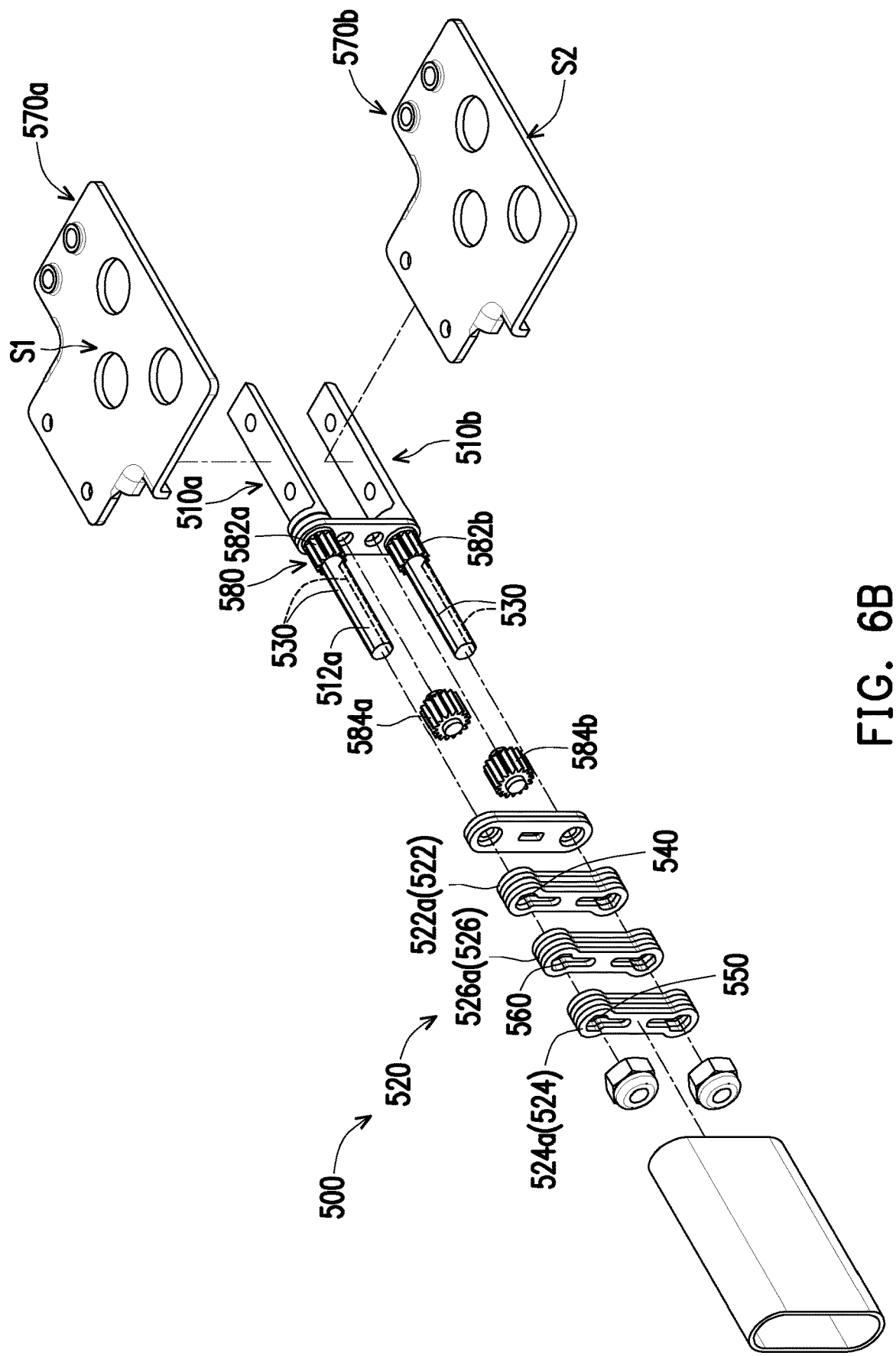
FIG. 6B is an exploded view of the torque hinge module of FIG. 6A.
Figure 6C:
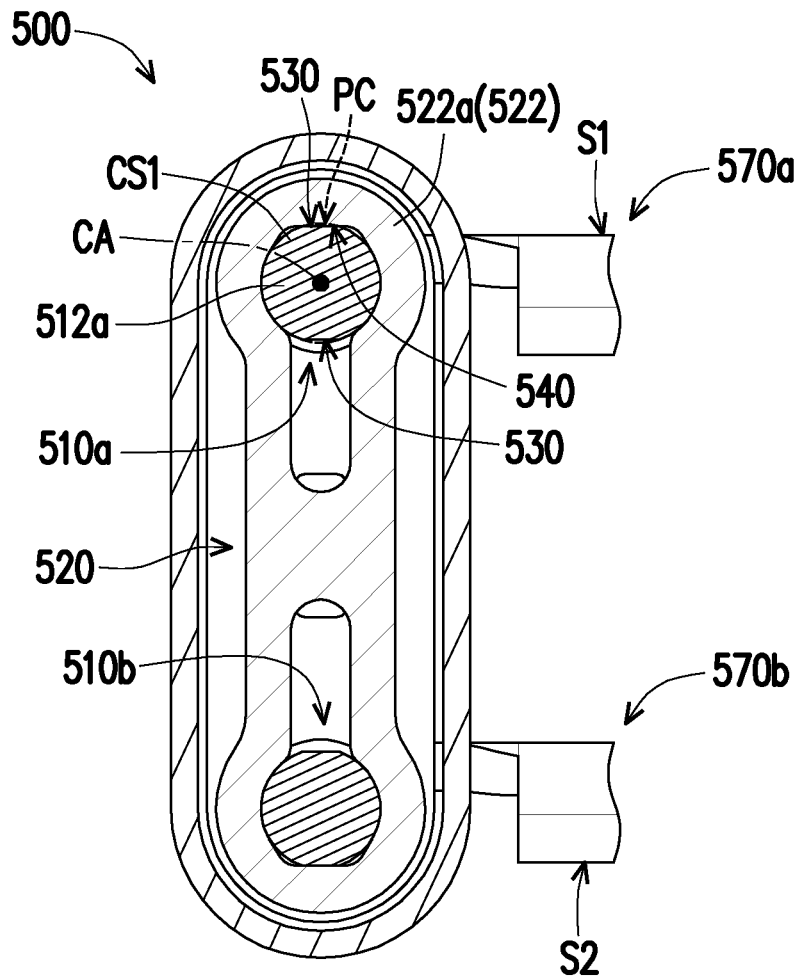
FIG. 6C to FIG. 6E illustrate an operation flow of the torque hinge module of FIG. 6A.
Figure 6D:
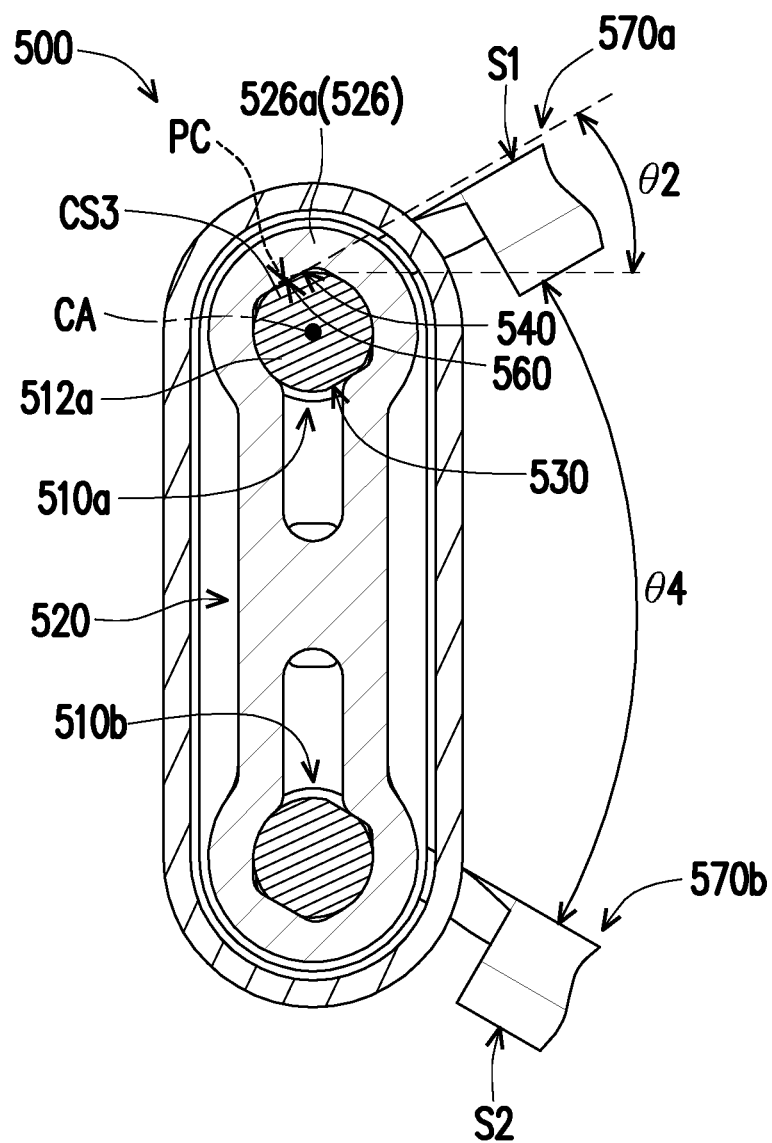
Figure 6E:
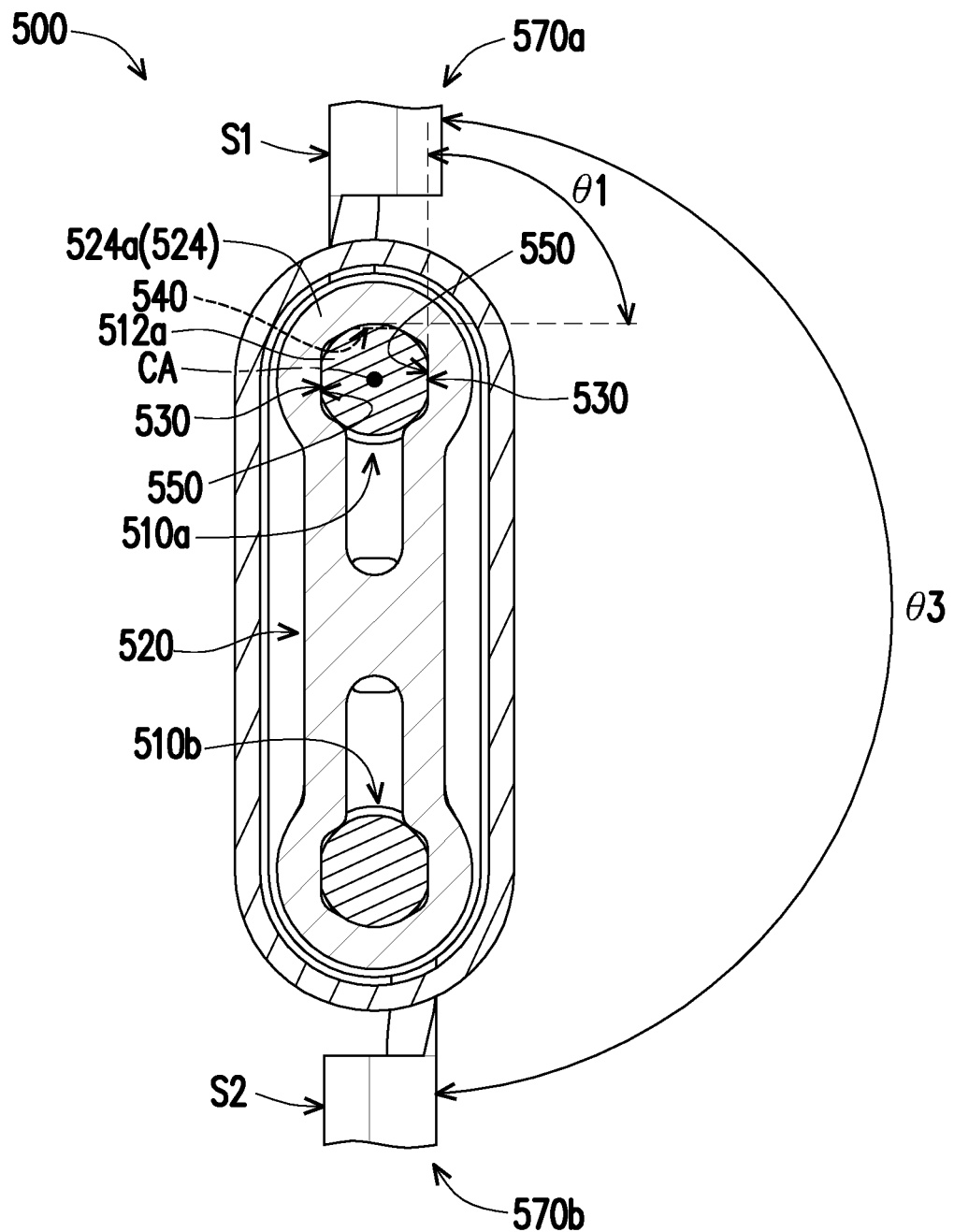

FIG. 6A is a schematic diagram of a torque hinge module according to an embodiment of the disclosure. FIG. 6B is an exploded view of the torque hinge module of FIG. 6A. FIG. 6C and FIG. 6E illustrate an operation flow of the torque hinge module of FIG. 6A.

In a torque hinge module 500 shown in FIG. 6A to FIG. 6E, configurations and functions of a rotating element 510a, a rotating element 510b, a shaft portion 512a, a first bearing surface 530, a second bearing surface 540, a third bearing surface 550, a fourth bearing surface 560, a bracket 570a, a bracket 570b, a synchronization mechanism 580, a driving gear 582a, a driving gear 582b, a synchronization gear 584a, and a synchronization gear 584b are similar to configurations and functions of the rotating element 410a, the rotating element 410b, the shaft portion 412a, the first bearing surface 430, the second bearing surface 440, the third bearing surface 450, the fourth bearing surface 460, the bracket 470a, the bracket 470b, the synchronization mechanism 480, the driving gear 482a, the driving gear 482b, the synchronization gear 484a, and the synchronization gear 484b in the torque hinge module 400 of FIG. 5A to FIG. 5E, and details thereof are not repeated.

A difference between the torque hinge module 500 shown in FIG. 6A to FIG. 6E and the torque hinge module 400 shown in FIG. 5A to FIG. 5E is that the notches of a first torque element 522, a second torque element 524 and a third torque element 526 in a torque assembly 520 are all located closer to the rotating element 510b. A number of the second bearing surfaces 540 and a number of the fourth bearing surfaces 560 are both one. The number of the third bearing surfaces 550 is two. In other words, the number of the bearing surface may be increased or decreased according to actual design requirements.

In summary, in the torque hinge module of the disclosure, the torque assembly is rotatably sleeved on the rotating element to generate torque, one of the rotating element and the torque assembly has the first bearing surface, and the other one of the rotating element and the torque assembly has the second bearing surface and the third bearing surface corresponding to the first bearing surface, there is a first included angle between a plane where the second bearing surface is located and a plane where the third bearing surface is located, a shape of the first bearing surface corresponds to a shape of the second bearing surface, and the shape of the first bearing surface corresponds to a shape of the third bearing surface. By making the first bearing surface bear against the second bearing surface or the third bearing surface, the torque generated when the torque assembly is sleeved on the rotating element may be reduced, which helps to accurately fix the torque hinge module at a specific angle.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A torque hinge module comprising:
    a rotating element; and
    a torque assembly rotatably sleeving the rotating element to generate torque,
    wherein one of the rotating element and the torque assembly has a first bearing surface, the other one of the rotating element and the torque assembly has a second bearing surface and a third bearing surface corresponding to the first bearing surface, and there is a first included angle between a plane where the second bearing surface is located and a plane where the third bearing surface is located,
    wherein a shape of the first bearing surface corresponds to a shape of the second bearing surface, the shape of the first bearing surface corresponds to a shape of the third bearing surface, and when the rotating element rotates relative to the torque assembly to make the first bearing surface bear against the second bearing surface or the third bearing surface, the torque is reduced,
    wherein the first bearing surface is a plane, the second bearing surface is a plane, and the third bearing surface is a plane,
    wherein the rotating element has a shaft portion, a cross section is defined at a part of the shaft portion, where the part of the shaft portion does not have the first bearing surface, the second bearing surface, and the third bearing surface, the cross section is perpendicular to a central axis of the shaft portion, and a circle is defined by an outermost periphery of the cross section of the shaft portion,
    wherein when the rotating element rotates and the first bearing surface bears against the second bearing surface, orthogonal projections of the first bearing surface and the second bearing surface on the cross section are located in the circle,
    wherein when the rotating element rotates and the first bearing surface bears against the third bearing surface, orthogonal projections of the first bearing surface and the third bearing surface on the cross section are located in the circle,
    wherein the other one of the rotating element and the torque assembly further has a fourth bearing surface corresponding to the first bearing surface, there is a second included angle between the plane where the second bearing surface is located and a plane where the fourth bearing surface is located, and when the rotating element rotates relative to the torque assembly to make the first bearing surface bear against the fourth bearing surface, the torque is reduced.

2. The torque hinge module as claimed in claim 1, wherein the first included angle is 90 degrees.

3. The torque hinge module as claimed in claim 1, wherein the rotating element has the first bearing surface, and the torque assembly has the second bearing surface and the third bearing surface.

4. The torque hinge module as claimed in claim 3, wherein the torque assembly comprises:
    a first torque element having the second bearing surface; and
    a second torque element having two third bearing surfaces, wherein the first bearing surface is adapted for bearing against the corresponding third bearing surface.

5. The torque hinge module as claimed in claim 1, wherein the torque assembly has the first bearing surface, and the rotating element has the second bearing surface and the third bearing surface.

6. The torque hinge module as claimed in claim 5, wherein the torque assembly comprises two torque elements, and each of the torque elements has the first bearing surface.

7. The torque hinge module as claimed in claim 1, wherein a number of the rotating elements is two, the torque assembly is rotatably sleeved on the two rotating elements, and the torque hinge module further comprises:
    two brackets fixed to the rotating elements; and
    a synchronization mechanism connected between the two rotating elements, so that the two rotating elements pivot synchronously.

8. The torque hinge module as claimed in claim 1, further comprising:
    two brackets, wherein one of the two brackets sleeves the torque assembly, and the other one of the two brackets is fixed to the rotating element.

* * * * *